United States Patent
Rossi et al.

(10) Patent No.: US 9,658,747 B2
(45) Date of Patent: May 23, 2017

(54) VIRTUAL TABS SUPPORTING WEB CONTENT SUSPENSION

(71) Applicant: Microsoft Technology Licensing, LLC, Redmond, WA (US)

(72) Inventors: Jacob S. Rossi, Seattle, WA (US); Michael J. Patten, Sammamish, WA (US); Michael J. Ens, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 14/043,711

(22) Filed: Oct. 1, 2013

(65) Prior Publication Data
US 2015/0095838 A1    Apr. 2, 2015

(51) Int. Cl.
G06F 3/0484    (2013.01)
G06F 3/0483    (2013.01)

(52) U.S. Cl.
CPC ................. *G06F 3/0483* (2013.01)

(58) Field of Classification Search
CPC ............................ G06F 3/0484; G06F 3/0483
USPC ........................................................ 715/777
See application file for complete search history.

(56) References Cited

U.S. PATENT DOCUMENTS

| | | | |
|---|---|---|---|
| 7,757,239 B2 | 7/2010 | Beck | |
| 8,356,277 B1 | 1/2013 | Bank et al. | |
| 8,474,048 B2 | 6/2013 | Masood | |
| 2007/0101061 A1 | 5/2007 | Baskaran et al. | |
| 2009/0327947 A1* | 12/2009 | Schreiner | G06F 3/0483 715/777 |
| 2011/0022984 A1 | 1/2011 | van der Meulen et al. | |
| 2012/0303697 A1 | 11/2012 | Alstad | |
| 2012/0304082 A1 | 11/2012 | Patten et al. | |
| 2013/0061159 A1 | 3/2013 | Tseng et al. | |
| 2013/0061160 A1 | 3/2013 | Tseng | |
| 2013/0067494 A1 | 3/2013 | Srour | |
| 2013/0080930 A1* | 3/2013 | Johansson | G06F 9/46 715/760 |
| 2013/0275853 A1 | 10/2013 | Eidson et al. | |

(Continued)

FOREIGN PATENT DOCUMENTS

WO    WO-2013015968    1/2013

OTHER PUBLICATIONS

"Guidelines for App Suspend and Resume (Windows Store Apps)", Retrieved from <http://msdn.microsoft.com/en-us/library/windows/apps/hh465088.aspx> on Aug. 3, 2013, (Jun. 11, 2013), 2 pages.

(Continued)

*Primary Examiner* — Andrea Leggett

(57) ABSTRACT

A Web application displays Web content in a user interface (UI) tab having multiple associated virtual tabs. The multiple associated virtual tabs can include a visible tab hosting Web content that is currently visible, one or more hidden tabs each hosting Web content that is not currently visible, and optionally one or more empty tabs each hosting no Web content or only primitive Web content. For each hidden tab, the Web content hosted in the hidden tab is suspended, which refers to ceasing execution of instructions in and/or other operations performed by the Web content. For example, audio/video playback is paused, execution of script instructions ceases, and so forth.

20 Claims, 9 Drawing Sheets

(56) References Cited

U.S. PATENT DOCUMENTS

| | | | |
|---|---|---|---|
| 2014/0281858 A1* | 9/2014 | Yi | G06F 17/2247 715/205 |
| 2015/0095758 A1 | 4/2015 | Rossi et al. | |

OTHER PUBLICATIONS

"Internet Explorer 10 on Windows 8: One Browser, Two Experiences", Retrieved from <http://msdn.microsoft.com/en-us/library/ie/hh771832(v=vs.85).aspx> on Jul. 31, 2013, (Jul. 22, 2013), 3 pages.

"iOS App Programming Guide", Retrieved from <http://developer.apple.com/library/ios/documentation/iphone/conceptual/iphoneosprogrammingguide/iphoneappprogrammingguide.pdf>, (Apr. 23, 2013), 149 pages.

"Suspend and Resume Calls", Retrieved from: <http://help.sap.com/saphelp_nw04s/helpdata/en/45/19bf8c16f25d7ae10000000a11466f/content.htm> on Jul. 29, 2013, (Sep. 7, 2011), 3 pages.

"Using the Page Visibility API", Retrieved from <https://developer.mozilla.org/en-US/docs/Web/Guide/User_experience/Using_the_Page_Visibility_API> on Jul. 30, 2013, (Jun. 4, 2013), 2 pages.

Appel, Rachel "The Windows Store App Lifecycle", *In MSDN Magazine, Windows 8 Special Issue*, Retrieved from <http://msdn.microsoft.com/en-us/magazine/jj660301.aspx> on Aug. 3, 2013, (Oct. 15, 2012), 4 Pages.

Tineo, Luis "Memoir of a Magento Developer", Retrieved from: <http://www.kingletas.com/2012/09/how-does-magento-full-page-cache-works.html> on Jul. 29, 2013, (Sep. 2012), 7 pages.

"Non-Final Office Action", U.S. Appl. No. 14/043,705, Mar. 10, 2016, 20 pages.

"Using Firefox 1.5 caching", Mozilla Developer Network Retrieved from: https:web.archive.org/web/2012014134739/https://developer.mozilla.org/en-US/Using_Firefox_1.5_caching, Aug. 22, 2012, 5 pages.

Barrus,"Managin App Lifecycle So Your Apps Feel "Always Alive"", Windows 8 app developer blog—MSDN Blogs Retrieved from http://blogs.msdn.com/b/windowsappdev/archive/2012/04/10/managing-app-lifecycle-so-your-apps-feel-quot-always-alive-quot.aspx, Apr. 10, 2012, 8 pages.

Eidson,"WebKit Page Cache I—The Basics and WebKit Page Cache II—The unload Event", Retrieved from: http://webkit.org/blog/427/webkit-page-cache-i-the-basics/ and http://webkit.org/blog/516/webkit-page-cache-ii-the-unload-event/, Sep. 21, 2009, 12 pages.

Leatherman,"Don't Let the Door Hit You Onunload and Onbeforeunload", Retrieved from: zachleat.com, Apr. 22, 2008, 6 pages.

"Final Office Action", U.S. Appl. No. 14/043,705, Oct. 20, 2016, 24 pages.

"How can I make setInterval also work when a tab is inactive in Chrome?", Retrieved from <http://stackoverflow.com/questions/5927284/how-can-i-make-setinterval-also-work-when-a-tab-is-inactive-in-chrome, Aug. 26, 2011, 5 pages.

* cited by examiner

VIRTUAL TABS SUPPORTING WEB CONTENT SUSPENSION

BACKGROUND

As computing technology has advanced, computers have become increasingly interconnected. This interconnection allows large amounts of data to be available to computers, such as Web pages from numerous Web sites. Having such a large amount of data available is useful, but is not without its problems. One such problem is that it can be time consuming to have the Web pages the user desires obtained and displayed. This can lead to a frustrating user experience due to delays in the user being able to see the Web pages he or she desires.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, first Web content is displayed in a user interface tab of a Web application. A request is received to change from displaying the first Web content to displaying second Web content in the user interface tab. In response to the request, the second Web content is displayed in the user interface tab. The first Web content is suspended and kept in a first hidden tab corresponding to the user interface tab.

In accordance with one or more aspects, a first Web page hosted in a visible tab associated with a user interface tab of a Web browser is displayed. An empty tab is also generated. A request to change from displaying the first Web page to displaying a second Web page in the user interface tab is received. In response to the request, the second Web page is loaded in the previously generated empty tab. The previously generated empty tab is switched to being the visible tab, and the second Web page hosted in the visible tab in the user interface tab is displayed.

BRIEF DESCRIPTION OF THE DRAWINGS

The same numbers are used throughout the drawings to reference like features.

DETAILED DESCRIPTION

Virtual tabs supporting web content suspension are discussed herein. A Web application displays Web content in a user interface (UI) tab having multiple associated virtual tabs. The multiple associated virtual tabs can include a visible tab hosting Web content that is currently visible, one or more hidden tabs each hosting Web content that is not currently visible, and optionally one or more empty tabs each hosting no Web content or primitive Web content (e.g., a blank Web page). For each hidden tab, the Web content hosted in the hidden tab is suspended, which refers to ceasing performance of operations and/or actions by the Web content. For example, audio/video playback is paused, execution of script instructions ceases, and so forth.

The multiple virtual tabs facilitate changing which Web content is displayed at any given time, increasing the speed at which such changes can be made. When particular Web content in the visible tab is no longer to be displayed (e.g., due to the user navigating away from the Web content), the Web content is suspended and the visible tab becomes a hidden tab. The new Web content to be displayed can be obtained and hosted in a previously generated empty tab, so additional time and resources need not be expended to generate a tab to host the obtained Web content. However, if the new Web content to be displayed is already hosted in a hidden tab, then the Web content in the hidden tab is reactivated and the hidden tab becomes the new visible tab.

Figure 1:
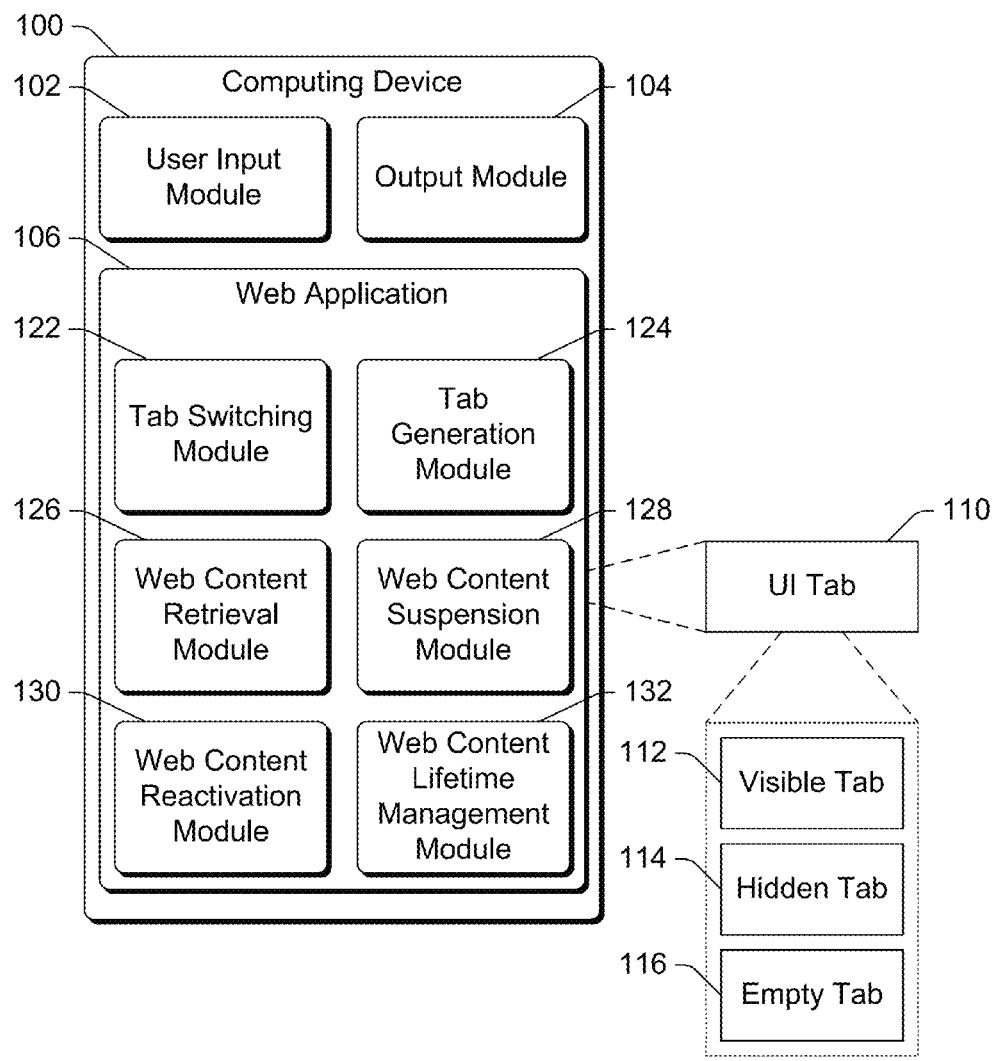
FIG. 1 is a block diagram illustrating an example computing device implementing the virtual tabs supporting web content suspension in accordance with one or more embodiments.

FIG. 1 is a block diagram illustrating an example computing device 100 implementing the virtual tabs supporting web content suspension in accordance with one or more embodiments. The computing device 100 can be a variety of different types of devices, such as a physical device or a virtual device. For example, the computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 100 can also be a virtual device, such as a virtual machine running on a physical device. A virtual machine can be run on any of a variety of different types of physical devices (e.g., any of the various types listed above). Thus, the computing device 100 may range from full resource devices with substantial memory and processor resources (e.g., personal computers, game consoles) to low-resource devices with limited memory and/or processing resources (e.g., traditional set-top boxes, handheld game consoles).

The computing device 100 includes a user input module 102, an output module 104, and a web application 106. The user input module 102 receives user inputs from a user of the computing device 100. User inputs can be provided in a variety of different manners, such as by pressing one or more keys of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100. User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the computing device 100 (e.g., by the Web application 106). This content can be, for example, a display or playback portion of a user interface (UI). The content can be displayed or otherwise played back by components of the computing device 100 (e.g., speakers, interactive display devices, etc.). Alternatively, the output module 104 can generate one or more signals that are output to other devices or components (e.g., speakers, display devices, etc.) that are separate from the computing device 100.

The Web application 106 is an application that displays or otherwise presents Web content. The Web application 106 can be implemented as a separate application run by an operating system of the computing device 100, or alternatively as at least part of the operating system of the computing device 100. Web content refers to various types of electronic content that can be displayed or otherwise presented by the computing device 100. The Web content is typically written in a markup language, such as eXtensible Markup Language (XML) or HyperText Markup Language (HTML). The Web content can also include content written in other languages, such as JavaScript, Cascading Style Sheets (CSS), and so forth. In one or more embodiments, the Web content is a Web page.

In one or more embodiments, the Web content is one or more Web pages, and the Web application 106 is a Web browser that obtains the Web pages from various Web sites via a network such as the Internet, a local area network (LAN), a public telephone network, an intranet, other public and/or proprietary networks, combinations thereof, and so forth. Alternatively, the Web application 106 can be other types of applications that obtain Web pages or other Web content from Web sites or other sources, such as audio/video playback applications, electronic book or magazine readers, and so forth.

Additionally, in one or more embodiments the Web application 106 supports virtual tabs associated with a UI tab. A UI tab 110 refers to the user interface area where Web content is displayed by the Web application 106. The Web application 106 can have multiple UI tabs, each of which can be a particular instance of the Web application 106. Associated with or corresponding to the UI tab 110 is multiple virtual tabs, each of which is a container (e.g., a data structure) that hosts (e.g., stores) Web content. Each virtual tab associated with a UI tab is maintained in the same type of memory as the Web application 106 (e.g., Random Access Memory of the computing device 100). Web content hosted by one of the multiple virtual tabs associated with a UI tab can be displayed at any given time—Web content hosted by others of the multiple virtual tabs associated with the UI tab is not displayed. Although Web content is discussed herein as being displayed, it should be noted that Web content can additionally or alternatively be presented in other manners, such as being played back audibly.

In one or more embodiments, a single UI tab is displayed by the Web application 106 at a time. Alternatively, multiple UI tabs can be displayed by the Web application 106 at a time, with multiple virtual tabs being associated with each UI tab. Each UI tab can have its own separate set of associated multiple virtual tabs, or alternatively one or more of the multiple virtual tabs can be associated with no particular UI tab (also referred to as the one or more virtual tabs being associated with multiple UI tabs).

The multiple virtual tabs can be different types of tabs, including a visible tab, a hidden tab, and an empty tab. A visible tab refers to a virtual tab hosting Web content that is currently visible or would be visible if the Web application 106 were active (e.g., the Web content that would be displayed if the Web application 106 were not minimized or covered by another window). A hidden tab refers to a virtual tab hosting Web content that is not currently visible. In one or more embodiments, the Web content hosted in a hidden tab is suspended as discussed in more detail below. An empty tab refers to a virtual tab that that hosts no Web content or alternatively very simple or primitive Web content (e.g., Web content that results in no display or less than a threshold amount of data being displayed, such as a blank Web page (a Web page that includes no HTML) or a Web page that displays the words "Empty page").

At any given time, a UI tab can have one associated visible tab, zero or more associated hidden tabs, and zero or more empty tabs. In the example of FIG. 1, associated with the UI tab 110 is a visible tab 112 and a hidden tab 114. An empty tab 116 is also available for use by the UI tab 110, and can be associated with the UI tab 110 or alternatively available for use by any of multiple UI tabs.

Web content being suspended refers to ceasing execution of instructions in the Web content, ceasing performance of operations and/or actions by the Web content, and so forth. For example, audio/video playback is paused, execution of script instructions ceases, and so forth. Although suspended, the Web content remains in the same type of memory as the Web application 106 (e.g., Random Access Memory of the computing device 100). The Web content need not be transformed into or written into another format or data structure, need not be transferred to a different type of memory (e.g., an optical or magnetic disk), and so forth. The suspended Web content remains in memory as if the Web content were hosted by a visible tab, except for the Web content being suspended. The Web content can thus be resumed quickly without needing to be read in from a slower memory or storage device (e.g., a magnetic or solid state disk). Various actions are taken to suspend Web content as well as resume Web content, as discussed in more detail below.

The Web application 106 includes multiple modules that facilitate usage of the multiple virtual tabs associated with the UI tab 110. Although these modules are illustrated as being part of the Web application 106, it should be noted that one or more of the modules can be implemented by other applications or programs (e.g., by an operating system of the computing device 100). These modules include a tab switching module, a tab generation module 124, a Web content retrieval module 126, a Web content suspension module 128, a Web content reactivation module 130, and a Web content lifetime management module 132.

The tab switching module 122 manages the tabs 112-116, including switching which tab is visible, which tab(s) are hidden, and which tab(s) are empty. The tab generation module 124 creates new tabs 112-116. The Web content retrieval module 126 retrieves or otherwise obtains Web content to be hosted by a tab 112-116. The Web content suspension module 128 suspends the Web content hosted by a visible tab 112, and the Web content reactivation module 130 resumes or reactivates the Web content hosted by a hidden tab 114. The Web content lifetime management module 132 manages how long a hidden tab 114 and/or an empty tab 116 is maintained, as well as when to create a new empty tab 116.

Figure 2:
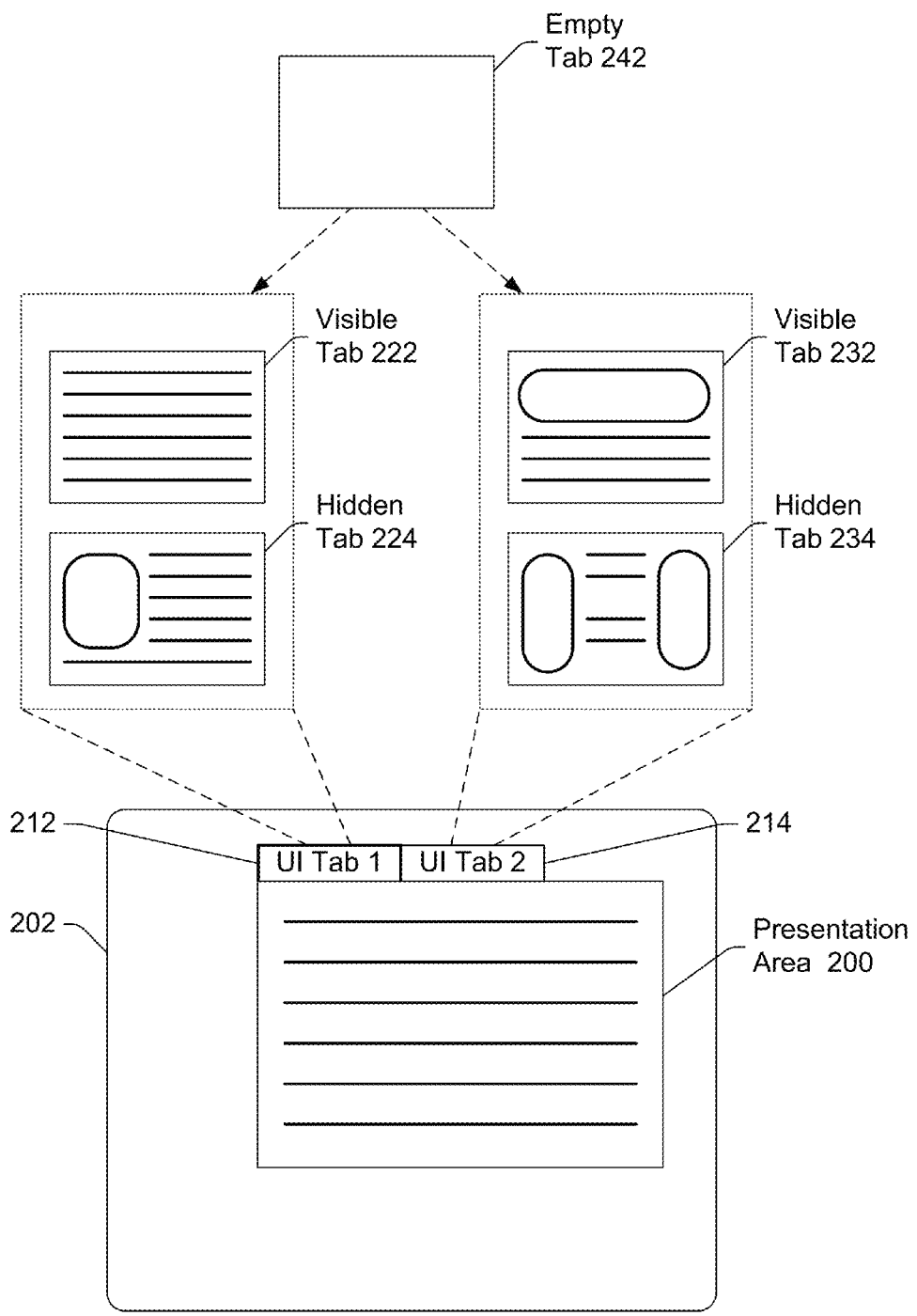
FIG. 2 illustrates an example of a user interface tab and virtual tabs in accordance with one or more embodiments.

FIG. 2 illustrates an example of a UI tab and virtual tabs in accordance with one or more embodiments. A presentation area 200 of a Web application is illustrated on a display 202. Two different UI tabs 212 and 214 are displayed on the display 202 by the Web application, either of which can be the active UI tab that is displayed in the presentation area 200. In one or more embodiments, only one of the UI tabs 212 and 214 is the active UI tab that is displayed at any given time.

Each UI tab 212 and 214 has its own associated visible tab and hidden tab, and an empty tab is available for use by either UI tab 212 or 214. However, it should be noted that the visible tab associated with a UI tab 212 or 214 is only displayed if the associated UI tab 212 or 214 is currently the active UI tab. For the UI tab 212, the associated visible tab 222 includes Web content that is text (illustrated as lines in the visible tab 222) and that is currently displayed in the presentation area 200 when the UI tab 212 is the active UI tab. The associated hidden tab 224 includes Web content that is text and a picture (illustrated as lines and a rounded rectangle in the hidden tab 224).

For the UI tab 214, the associated visible tab 232 includes Web content that is text (illustrated as lines and a rounded rectangle in the visible tab 232) and that is currently displayed in the presentation area 200 when the UI tab 214 is the active UI tab. The associated hidden tab 234 includes Web content that is text and pictures (illustrated as lines and rounded rectangles in the hidden tab 234).

An empty tab 242 includes no Web content, and is available for use by either UI tab 212 or 214. The empty tab 242 can thus be viewed as being associated with no particular UI tab. Alternatively, one or more UI tabs can each have a separate associated empty tab that is available for use by the associated UI tab but not other UI tabs.

Alternatively, both of the UI tabs 212 and 214 can be the active UI tabs concurrently. In such situations, the visible tabs 222 and 232 are both displayed concurrently (e.g., in different portions of presentation area 200).

Figure 3:
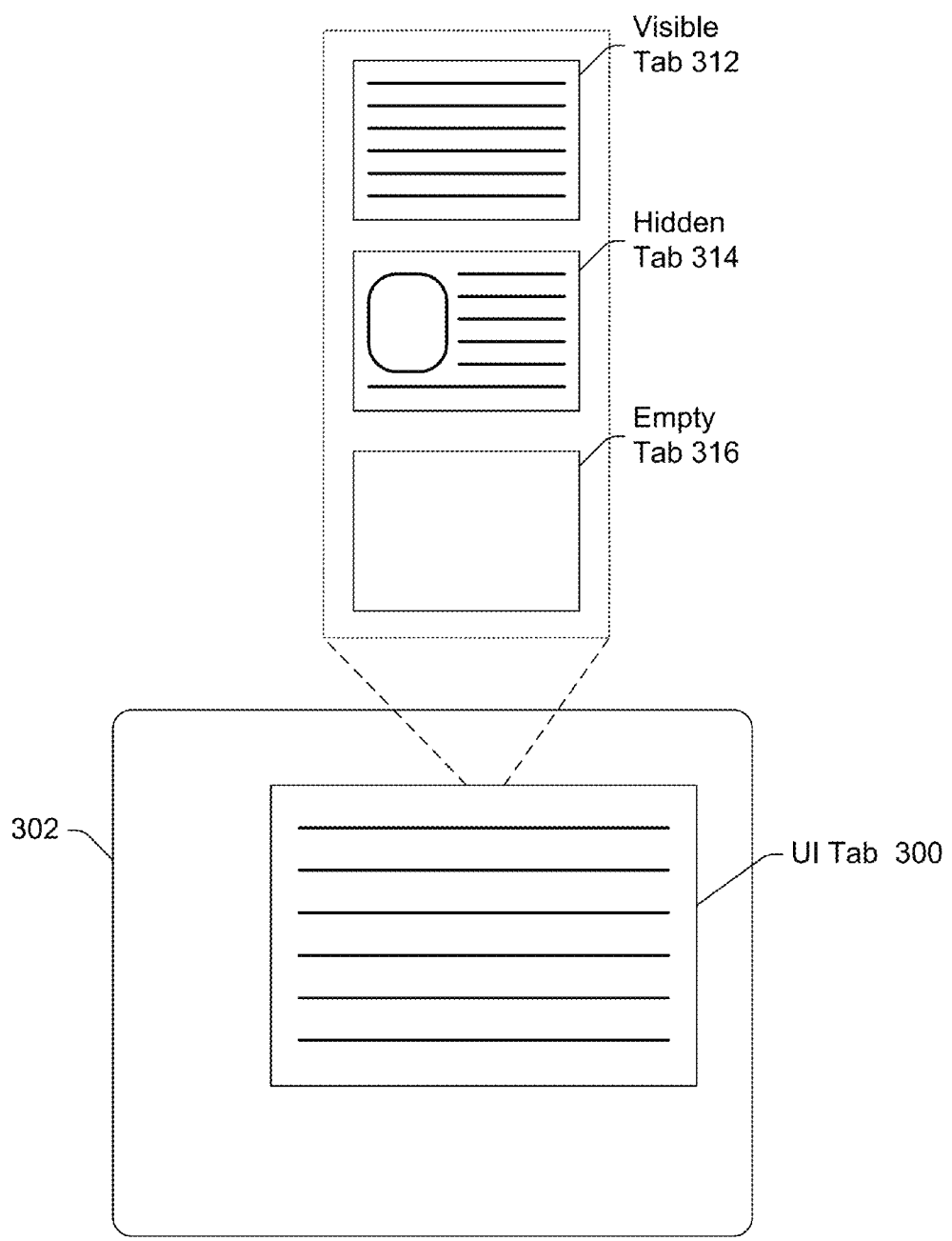
FIG. 3 illustrates another example of a user interface tab and virtual tabs in accordance with one or more embodiments.

FIG. 3 illustrates another example of a UI tab and virtual tabs in accordance with one or more embodiments. A UI tab 300 of a Web application is illustrated on a display 302. In FIG. 3, the Web application supports a single UI tab or presentation area (rather than multiple UI tabs in a presentation area as illustrated in FIG. 2). The UI tab 300 has an associated visible tab 312, an associated hidden tab 314, and an associated empty tab 316. The visible tab 312 includes Web content that is text (illustrated as lines in the visible tab 312) and that is currently displayed in the UI tab 300. The hidden tab 314 includes Web content that is text and a picture (illustrated as lines and a rounded rectangle in the hidden tab 314). The empty tab 316 includes no Web content.

Returning to FIG. 1, the multiple tabs associated with the UI tab 110 are used to increase the speed at which Web content can be displayed when changing the Web content that is displayed, allowing the Web content to be displayed more quickly.

The tab generation module 124 generates the virtual tabs associated with the UI tab 110. Generation of a virtual tab can include various actions, such as having memory allocated for the virtual tab, having various data structures created, having various objects generated and registered with an operating system of the computing device 100, and so forth. The tab generation module 124 generates an empty tab, which remains empty until a request to display Web content not already hosted in a hidden tab is received. In response to a request to display Web content that is not already hosted in a hidden tab is received, the Web application 106 obtains the Web content from the Web content source, loads the obtained Web content in the empty tab (so the Web content is hosted in the empty tab), and makes the empty tab the visible tab. Thus, the Web content can be displayed more quickly because additional time and resources need not be expended to generate a tab to host the obtained Web content—the empty tab is already generated.

The Web content retrieval module 126 retrieves or otherwise obtains Web content from a Web content source for hosting by a tab 112-116. In one or more embodiments the Web content is loaded into an empty tab 116, although alternatively the Web content can be loaded into other tabs. Loading Web content into a tab (or loading a tab) refers to storing the Web content in the tab that hosts the Web content.

The tab switching module 122 determines when to switch which virtual tab is the visible tab, which virtual tab(s) are hidden tabs, and which virtual tab(s) are empty tabs. Switching which virtual tabs are visible, hidden, and empty occurs in response to changing which Web content is being displayed. The tab switching module 122 notifies the Web content suspension module 128 to suspend Web content in a virtual tab that has become a hidden tab, and notifies the Web content reactivation module 130 to reactive or resume Web content in a virtual tab that has become a visible tab.

The tab switching module 122 also keeps track of which virtual tab is visible, which virtual tab(s) are hidden, and which virtual tab(s) are empty. The module 122 can do this in any of a variety of manners, such as maintaining a list or other record identifying the virtual tabs and for each virtual tab whether it is visible, hidden or empty. Alternatively, the module 122 can do this in other manners, such as by using flags or other identifiers in each virtual tab that indicates whether the virtual tab is visible, hidden, or empty.

It should be noted that the Web application 106 can also unload Web content at various times. Unloading Web content from a tab (or unloading a tab) refers to deleting or otherwise removing the Web content from the tab that was hosting the Web content. The virtual tab that hosted the unloaded Web content can be deleted, in which case the various actions taken to generate the virtual tab are undone (e.g., memory for the virtual tab is de-allocated, created data structures are deleted, objects generated and registered with an operating system of the computing device 100 are deleted, and so forth). Alternatively, rather than deleting the virtual tab, the virtual tab can be switched to being an empty tab (also referred to as recycling the virtual tab).

Figure 4:
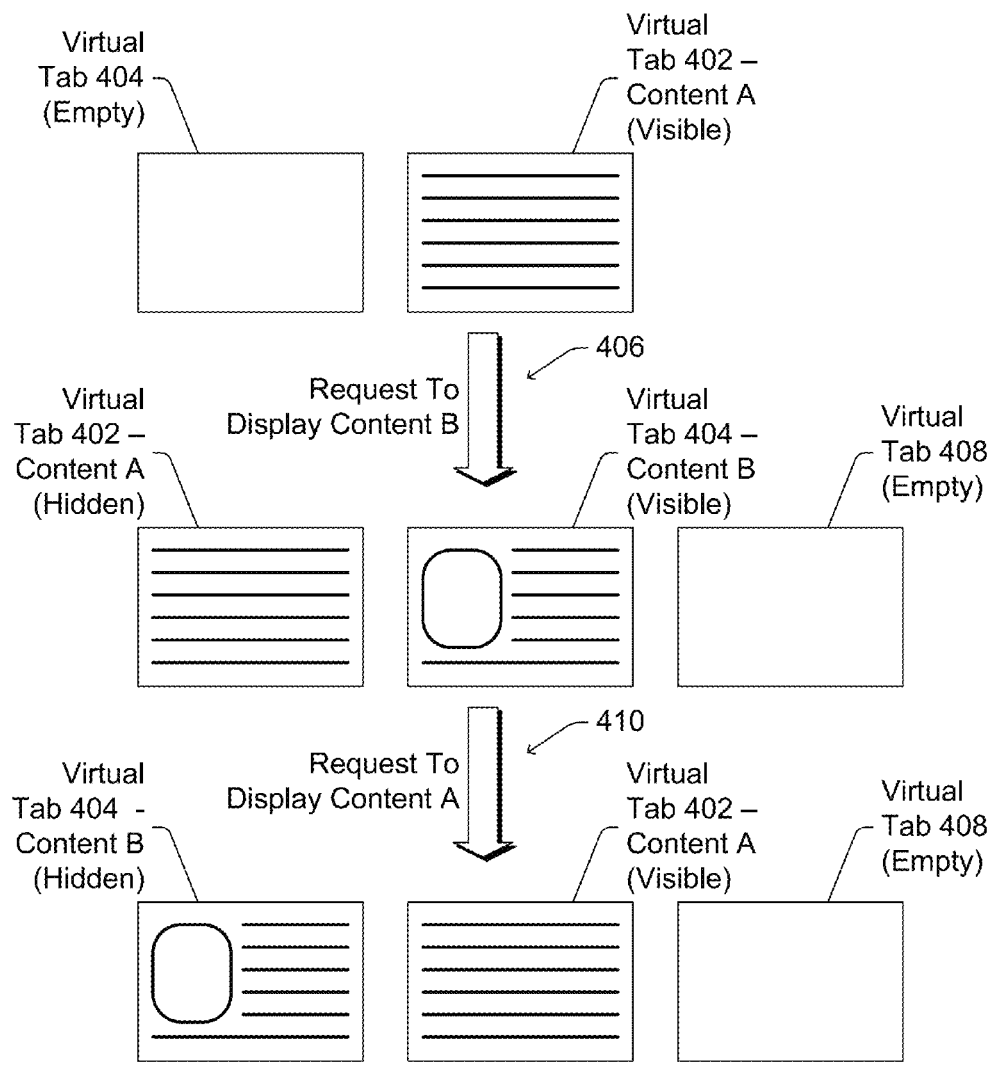
FIG. 4 illustrates an example of using the multiple virtual tabs when changing which Web content is displayed in accordance with one or more embodiments.

FIG. 4 illustrates an example of using the multiple virtual tabs when changing which Web content is displayed in accordance with one or more embodiments. In FIG. 4, assume that a UI tab initially has an associated virtual tab 402 that is a visible tab, and a virtual tab 404 is an empty tab available for use. The virtual tab 402 hosts Web content that is text (illustrated as multiple lines) and is referred to as Content A.

A request 406 is received to display Content B in the UI tab. The request can be a user request (e.g., to navigate to the Web page that includes the Content B such as by using a forward button or gesture of a Web browser or entering an address of the Web content) or a request received from another module or component. In response to the request to display Content B, the Web content that is Content B (illustrated as lines and a rounded rectangle) is loaded into the virtual tab 404, and the virtual tab 404 is made the visible tab. The virtual tab 402 is made a hidden tab, and Content A is suspended. A virtual tab 408 that is an empty tab is also generated.

A request 410 is subsequently received to display Content A again in the presentation area. The request can be a user request (e.g., to navigate to the Web page that includes the Content A such as by using a back button or gesture of a Web browser or entering an address of the Web content) or a request received from another module or component. In response to the request to display Content A, the virtual tab 402 is made the visible tab, the virtual tab 404 is made a hidden tab, and Content B is suspended.

Thus, as can be seen in FIG. 4, when a request is received that results in particular Web content no longer being displayed, that particular Web content is suspended and the virtual tab that hosts that particular Web content becomes a hidden tab. That particular Web content can then be quickly resumed and the virtual tab that hosts that particular Web content can again become the visible tab in response to a request for the particular Web content to be displayed again. That particular Web content can be quickly displayed again due to the virtual tab that hosts that particular Web content remaining in memory (e.g., Random Access Memory) rather than needing to be re-obtained from the source of the Web content (e.g., from a server via a network) and rather than needing to be re-loaded from a slower memory or storage device (e.g., a disk drive).

Figure 5:
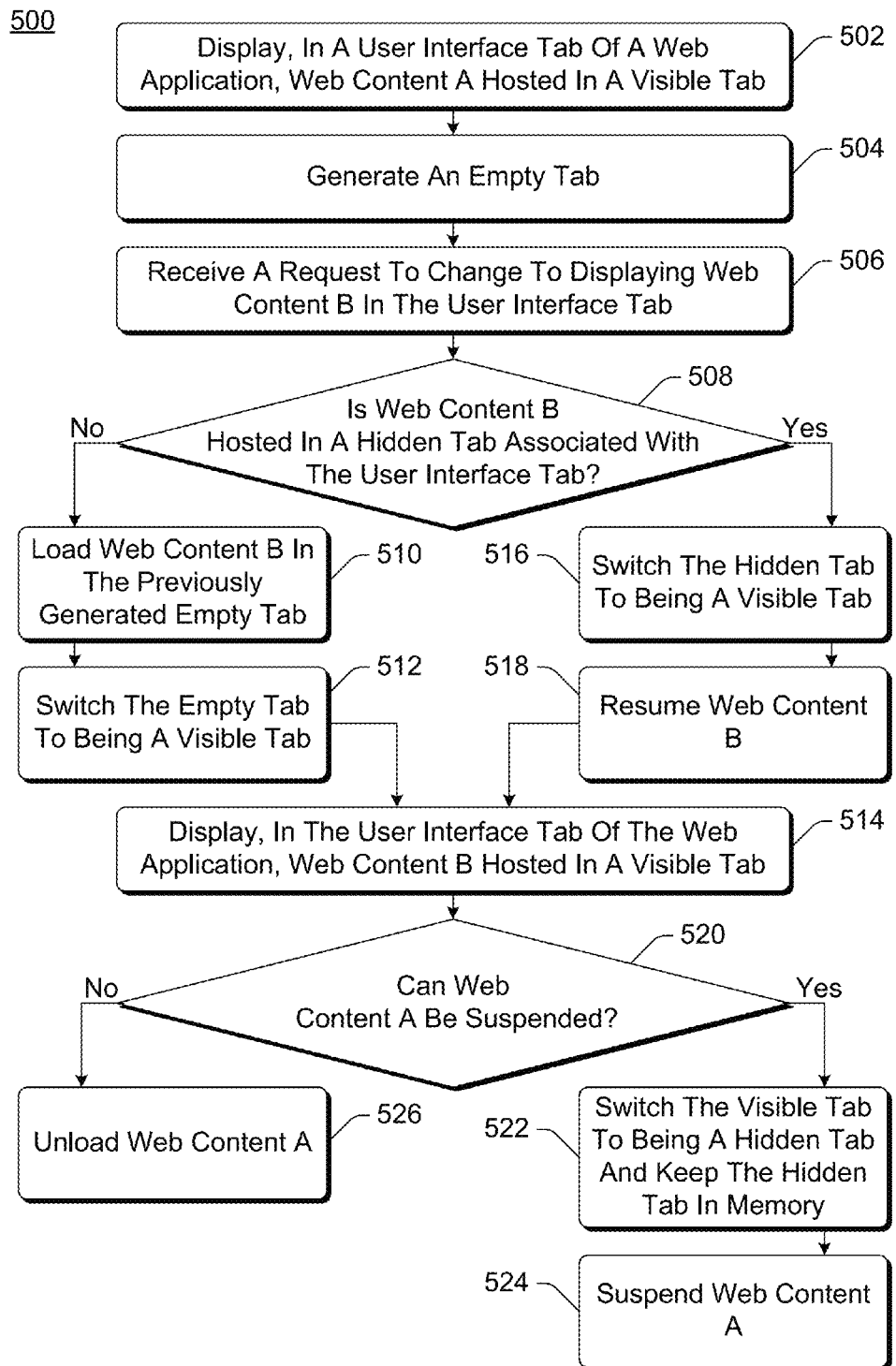
FIG. 5 is a flowchart illustrating an example process for implementing virtual tabs supporting Web content suspension in accordance with one or more embodiments.

FIG. 5 is a flowchart illustrating an example process 500 for implementing virtual tabs supporting Web content suspension in accordance with one or more embodiments. Process 500 is carried out by a Web application, such as Web application 106 of FIG. 1, and can be implemented in software, firmware, hardware, or combinations thereof. Process 500 is shown as a set of acts and is not limited to the order shown for performing the operations of the various acts. Process 500 is an example process for implementing virtual tabs supporting Web content suspension; additional discussions of implementing virtual tabs supporting Web content suspension are included herein with reference to different figures.

In process 500, in a user interface tab of a Web application, Web content A hosted in a visible tab is displayed (act 502). Web content A can be any of a variety of different types of Web content, such as a Web page, as discussed above. The visible tab is a virtual tab associated with the user interface tab as discussed above.

An empty tab is also generated (act 504). An empty tab refers to a virtual tab that that hosts no Web content or alternatively primitive Web content as discussed above. The empty tab can be associated with the user interface tab, or alternatively associated with no particular user interface tab as discussed above.

A request is received to change to displaying Web content B in the user interface tab (act 506). Web content B can be any of a variety of different types of Web content, such as a Web page, as discussed above. The request can be received via any of a variety of different user inputs, or from another component or module as discussed above.

A check is made as to whether Web content B is hosted in a hidden tab associated with the user interface tab (act 508). A hidden tab refers to a virtual tab hosting Web content that is not currently visible as discussed above.

If Web content B is not hosted in a hidden tab associated with the user interface tab, then Web content B is obtained and loaded into the previously generated empty tab (act 510). The previously generated empty tab is the empty tab generated in act 504.

The empty tab is switched to being the visible tab associated with the user interface tab (act 512), and Web content B hosted in the visible tab is displayed in the user interface tab (act 514).

Returning to act 508, if Web content B is hosted in a hidden tab associated with the user interface tab, then the hidden tab hosting Web content B is switched to being the visible tab associated with the user interface tab (act 516). The Web content B in the hidden tab would have been previously suspended, so the Web content B is reactivated or resumed (act 518), and Web content B hosted in the visible tab is displayed in the user interface tab (act 514).

A check is also made as to whether Web content A can be suspended (act 520). Situations can arise in which Web content A cannot be suspended, such as if a database transaction is not completed within a threshold amount of time or a plug-in is not able to suspend itself as discussed in more detail below. If the Web content A can be suspended, then the previous visible tab hosting Web content A is switched to being a hidden tab that is kept in memory (act 522). The hidden tab is kept in, for example, Random Access Memory as discussed above. The Web content A is also suspended (act 524).

However, if the Web content A cannot be suspended, then the Web content A is unloaded (act 526).

Process 500 is discussed with reference to Web content B, if not hosted in a hidden tab associated with the user interface tab, being obtained and loaded into the previously generated empty tab. Alternatively, the Web content B can be loaded into a new visible tab without having been loaded into a previously generated empty tab.

It should be noted that in the discussions herein, reference is made to a hidden tab being associated with a UI tab. Alternatively, in some situations a hidden tab can be available for use by multiple UI tabs, and thus can be associated with no particular UI tab (also referred to as being associated with multiple UI tabs). For example, situations can arise in which a user accesses different Web content in a first UI tab, and a history record or travel log identifying at least some of the Web content that has been accessed is maintained. This Web content can be hosted in different hidden tabs associated with the first UI tab. A second UI tab can then be opened and the history record or travel log for the first UI tab copied to the second UI tab. In such situations, the one or more hidden tabs hosting Web content identified in the history record or travel log can be shared by (available for use by) the first and second UI tabs. If the user were to subsequently access the Web content hosted in a hidden tab, that hidden tab becomes the visible tab as discussed herein, and is also associated with the UI tab in which the Web content is displayed. As the hidden tab has become associated with a particular one of the UI tabs, it is no longer available for use by the other UI tab.

Suspending Web Content

Returning to FIG. 1, the Web content suspension module 128 suspends Web content, also referred to as suspending the virtual tab that hosts the Web content. The Web content reactivation module 130 resumes or reactivates the Web content, also referred to as resuming or reactivating the virtual tab that hosts the Web content.

Although the suspension and reactivation of Web content is discussed herein with reference to suspending and reactivating Web content in a hidden tab associated with a UI tab, it should be noted that the suspension and reactivation of Web content discussed herein can be used in various different scenarios. For example, in a Web application supporting multiple UI tabs, when one UI tab is not being displayed all of the tabs including Web content for that UI tab (including any visible tab) can be suspended as discussed herein, and when the UI tab is again being displayed one or more of the tabs including Web content for that UI tab (e.g., the visible tab) can be reactivated as discussed herein. By way of another example, if a Web application is minimized or otherwise not displayed on a computing device, the Web content displayed or otherwise presented by the web application can be suspended as discussed herein, and when the Web application is again displayed, the Web content displayed or otherwise presented by the Web application can be reactivated as discussed herein. By way of yet another example, if Web content were to be written to another storage device or memory (possibly being serialized or otherwise transformed prior to or as part of being written), the Web content can be suspended as discussed herein prior to being written to the other storage device or memory, and reactivated as discussed herein when read back from the other storage device or memory.

The Web content can include or implement various different elements, and these different elements can be suspended and reactivated in different manners. It should be noted, however, that Web content can include any combination of these different elements, and that the Web content need not include all of these elements.

One element that may be included or implemented in Web content is audio/video content for playback. The audio/video content is audio/video content played back by the Web content (e.g., by HTML instructions included in the Web content), and can be included in or otherwise identified by (e.g., linked to) by the Web content. When suspending Web content, the Web content suspension module 128 pauses playback of each audio and/or video content element in the Web content. In one or more embodiments, the Web content suspension module 128 enumerates the audio and/or video content elements in the Web content, and iterates through those audio and/or video content elements, pausing each audio and/or video content element. Thus, when Web content is suspended, video included or identified in the Web content is not played back, and audio included or identified in the Web content is not played back.

When reactivating Web content, the Web content reactivation module 130 resumes playback of audio and/or video content elements in the Web content. In one or more embodiments, the Web content reactivation module 130 enumerates the audio and/or video content elements in the Web content that were suspended by the Web content suspension module 128, and iterates through those audio and/or video content elements, resuming each audio and/or video content element. Thus, when Web content is reactivated, video included or identified in the Web content that was paused when the Web content was suspended resumes being played back, and audio included or identified in the Web content that was paused when the Web content was suspended resumes being played back.

It should be noted that, because the playback of the audio and/or video content was paused, when the Web content is reactivated the playback of the audio and/or video resumes at the location it was at when the Web content was suspended. No separate record of the locations that the audio and/or video playback were at when the Web content was suspended need be maintained. Thus, if the user navigates away from particular Web content and that particular Web content is suspended, when the user navigates back to that particular Web content and the Web content is reactivated, the user continues seeing video and/or hearing audio at the same location the video and/or audio was at when the user navigated away from the particular Web content.

Another element that may be included or implemented in Web content is an asynchronous request. An asynchronous request refers to a request that is part of an asynchronous operation—the Web content sends a request to another device or module but does not know when a reply to the request will be received. An example of such a request is a HyperText Transfer Protocol (HTTP) request, such as an XML HTTP Request (XHR).

When suspending Web content, the Web content may be waiting for a reply to one or more asynchronous requests. The Web content suspension module 128 monitors replies received by the Web application 106 that target the suspended Web content, and holds those replies (e.g., queues the replies). If the Web content that is the target of a reply is unloaded from memory, then the reply is deleted by the Web content suspension module 128. However, if the Web content is reactivated, then when reactivating the Web content, the Web content reactivation module 130 obtains the replies targeting the Web content and provides those replies to the Web content (e.g., in the order they were received and queued by the Web content suspension module 128). Thus, when the Web content is resumed, any replies to asynchronous requests are not lost—the Web content receives any replies to asynchronous requests that were received by the Web application 106 while the Web content was suspended.

Another element that may be included or implemented in Web content is a script. Web content can include script elements written in any of a variety of different scripting languages, such as JavaScript. Scripts request to be notified by a message pump or message dispatcher of the Web application 106 when particular events occur. These events can take various forms, such as the expiration of a timer, the occurrence of a particular user input (e.g., mouse click or movement), and so forth. When suspending Web content, the Web content suspension module 128 notifies the message pump or message dispatcher to stop providing at least some messages to the Web application 106.

In one or more embodiments, the Web content suspension module 128 can notify the message pump or message dispatcher to stop providing all messages to the Web content. Alternatively, the Web content suspension module 128 can notify the message pump or message dispatcher to stop providing a subset of messages to the Web content while allowing other messages to be provided to the Web content. This subset of messages is the messages that would trigger execution of a script in the Web content (e.g., messages notifying the Web content of events that the script has requested to be notified of). By stopping providing the subset of messages but not other messages to the Web content, if the script is executed in the same thread as other Web content operations, such other Web content operations are able to still receive events that they are to be notified of.

The Web content suspension module 128 notifies the message pump or message dispatcher to hold the messages that are not provided to the Web content (e.g., queue the messages). If the Web content to which the messages would be provided is unloaded from memory, then the Web content suspension module 128 notifies the message pump or message dispatcher to delete the messages. However, if the Web content is reactivated, then when reactivating the Web content, the Web content reactivation module 130 notifies the message pump or message dispatcher to provide those messages to the Web content (e.g., in the order they occurred and were queued by the message pump or message dispatcher). Thus, when the Web content is resumed, any messages for the script are not lost—the Web content receives any messages that would have been provided to the Web content had the Web content not been suspended.

Another element that may be included or implemented in Web content is an animation and/or transition. Web content can include elements that are declarative animations or transitions, such as elements written using CSS or JavaScript. Animations can identify a particular object that is to be animated, such as by moving between two locations over a particular amount of time, moving in a particular direction or in a particular manner (e.g., so as to appear spinning) for a particular amount of time (or indefinitely), and so forth. Transitions can identify a particular object that is to change in appearance (e.g., change color or brightness) over a particular amount of time, or fade away or fade in over a particular amount of time, and so forth.

When suspending Web content, the Web content suspension module 128 pauses each animation element and each transition element in the Web content. In one or more embodiments, the Web suspension module 128 stops a master timer that controls the animation and/or transition elements. Alternatively, the Web content suspension module 128 can enumerate the animation and/or transition elements in the Web content and iterate through those elements, pausing each animation and/or transition element. Thus, when Web content is suspended, animations and transitions are not rendered, the Web application 106 does not calculate where the animation or transition should be next (e.g., the next frame of the animation or transition to display), and so forth.

When reactivating Web content, the Web content reactivation module 130 resumes the master timer that controls the animation and/or transition elements, or alternatively resumes each animation element and each transition element in the Web content that was paused by the Web content suspension module 128 when suspending the Web content. In one or more embodiments, the Web content reactivation module 130 enumerates the animation and/or transition elements in the Web content, and iterates through those elements, resuming each animation and/or transition element. Thus, when Web content is reactivated, animations and transitions in the Web content resume.

It should be noted that, because the animations and transitions were paused or the master timer stopped, when the Web content is reactivated the animations and transitions resume at the locations they were at when the Web content was suspended. No separate record of the locations or states of the animations or transitions when the Web content was suspended need be maintained. Thus, if the user navigates away from particular Web content and that particular Web content is suspended, when the user navigates back to that particular Web content and the Web content is reactivated, the user continues seeing the animations and transitions at the same location and with the same state as when the user navigated away from the particular Web content.

Another element that may be included or implemented in Web content is a database transaction. Various different types of database transactions can be performed by Web content, such as Indexed Database (IndexedDB or Indexed DB) transactions. The database transactions can include multiple requests that are performed by another module or device, such as requests to add database entries, change database entries remove database entries, delete tables, and so forth. The database transaction is deemed to be completed if all the requests included in the transaction are successfully performed. If one or more requests in the transaction are not successfully performed then the transaction is deemed to be not completed (and any requests that were successfully performed are rolled back).

In one or more embodiments, when suspending Web content, the Web content suspension module 128 delays suspension of the Web content for a threshold amount of time to allow database transactions to be completed. This threshold amount of time can vary, and is selected so that the delay is not noticeable or is barely noticeable to a user (e.g., so that if any audio or video were being played back, the delay in suspension would be unnoticeable or barely noticeable to a user listening to or watching the playback). This threshold amount of time can be, for example, 100 milliseconds, although other values can alternatively be used. If the database transaction is completed within (e.g., in less than, or less than or equal to) the threshold amount of time, then the Web content suspension module 128 suspends the Web content. Whether database transactions have been completed can be determined in various manners, such as notification to the Web application 106 by the Web content when the database transaction completes, an indication of completion received from another device (e.g., that performs the requests in the transaction), and so forth. When reactivating Web content, the Web content reactivation module 130 need take no special actions with regard to the database transaction because the database transaction completed. However, if the database transaction is not completed within the threshold amount of time, then the Web application 106 unloads the Web content rather than suspending the Web content.

Alternatively, rather than waiting a threshold amount of time when suspending Web content, the Web content suspension module 128 can abort any database transactions that are in progress at the time suspension of the Web content is to occur. Which database transactions are in progress can be determined in various manners, such as notification to the Web application 106 by the Web content of the database transactions, an indication of database transactions received from another device (e.g., that performs the requests in the transaction), by monitoring communications between the Web content and another device (e.g., that performs the requests in the transaction), and so forth. When aborting a database transaction, the device that performs the request in the transaction is notified to rollback (e.g., undo) any requests in the transaction that were successfully performed, and the Web content is notified that the database transaction failed. When reactivating the Web content, the Web content reactivation module 130 need take no special actions with regard to the database transaction because the Web content was notified that the database transaction failed—the Web content can proceed to perform the database transaction again if desired.

Another element that may be included or implemented in Web content is Web worker threads. A Web worker thread refers to a thread executed from the Web content that executes a script, such as JavaScript. Web content can have multiple Web worker threads. When suspending Web content, the Web content suspension module 128 notifies the message pump or message dispatcher to stop providing messages to each of the Web worker threads of the Web content. In one or more embodiments, the Web content suspension module 128 enumerates the Web worker threads of the Web content, and iterates through those threads, notifying the message pump or message dispatcher to stop providing messages to each thread. Thus, when Web content is suspended, scripts in Web worker threads do not receive messages of events.

The Web content suspension module 128 notifies the message pump or message dispatcher to hold the messages that are not provided to the Web worker threads of the Web content (e.g., queue the messages). If the Web content to which the messages would be provided is unloaded from memory, then the Web content suspension module 128 notifies the message pump or message dispatcher to delete the messages. However, if the Web content is reactivated, then when reactivating the Web content, the Web content reactivation module 130 notifies the message pump or message dispatcher to provide the queued messages to those Web worker threads Web content (e.g., in the order they occurred and were queued by the message pump or message dispatcher). Thus, when the Web content is resumed, any messages for the scripts in the Web worker threads are not lost—the Web worker threads receive any messages that would have been provided to the threads had the Web content not been suspended.

In one or more embodiments, Web worker threads include only scripts, and thus all the message pump or message dispatcher can stop providing all messages to all of the Web worker threads of the Web content. Alternatively, if the scripts include additional operations, then the message pump or message dispatcher can stop providing only a subset of the messages to the Web worker threads (e.g., the messages that would trigger execution of a script in the Web content) as discussed above.

Another element that may be included or implemented in Web content is a plug-in. A plug-in refers to a component or module that adds a feature to the Web application 106, although is a separate component or module from the Web application 106. When suspending Web content, the Web content suspension module 128 invokes an application programming interface (API) of the plug-in. The plug-in can implement the API, allowing the Web content suspension module 128 to query the plug-in as to whether the plug-in is able to suspend itself, to request that the plug-in suspend itself, and to request that the plug-in reactivate or resume itself. If the plug-in is able to suspend itself, then the Web content suspension module 128 invokes the API of the plug-in, requesting that the plug-in suspend itself. The module 128 can request that the plug-in suspend itself in response to the plug-in indicating it is able to suspend itself, or alternatively the request to suspend the plug-in can be included as part of a request to indicate whether the plug-in can suspend itself. In response to the request from the Web content suspension module 128 to suspend itself, the plug-in suspends itself. The manner in which the plug-in suspends itself is up to the plug-in itself, but can include various different actions analogous to those discussed above, such as pausing audio and/or video playback, stopping animations or transitions, and so forth. The manner in which the plug-in suspends itself can also include various other actions, such as reducing a playback rate of video, deactivating particular components (e.g., cameras), and so forth.

In one or more embodiments, if the plug-in is not able to suspend itself (including situations in which the plug-in does not support an API allowing the Web content suspension module 128 to request that the plug-in suspend itself), then the Web application 106 unloads the Web content rather than suspending the Web content. Alternatively, if the plug-in is not able to suspend itself, then the Web application 106 unloads the plug-in and suspends the Web content. The Web content suspension module 128 can maintain a record of various references to or identifiers of the plug-in, such as references to APIs, references to callback functions, and so forth. When reactivating the Web content, the Web content reactivation module 130 re-loads the plug-in, and uses the record of the various references to or identifiers of the plug-in to allow the Web content to resume communication with and interaction with the plug-in.

Table I illustrates an example of an API referred to as IBFCacheable that can be implemented by a plug-in to allow the Web content suspension module 128 to request that the plug-in suspend itself. It should be noted that the IBFCacheable API is an example of an API that can be implemented by a plug-in, and that various other APIs can alternatively be implemented.

TABLE I

```
interface IBFCacheable : IUnknown
{
    [ ] HRESULT EnterBFCache( );
    [ ] HRESULT ExitBFCache( );
};
```

A plug-in that implements the IBFCacheable interface implements both an EnterBFCache method and an ExitBFCache method, neither of which takes any parameters.

When EnterBFCache( ) is called or invoked, operations performed by the plug-in that are not to happen on a suspended tab are stopped, such as webcam use, audio playback, and so forth. If all operations are stopped in such a way that they can be resumed in a graceful or user-friendly manner (e.g., audio playback resumed at the location it was at when the Web content was suspended), the plug-in returns an indication of success (e.g., an OK value or code). However, if operations are stopped in such a way that they cannot be resumed in a graceful or user-friendly manner, then the plug-in returns an indication of failure (e.g., a FAIL value or code). These operations performed by the plug-in are still stopped even if they cannot be resumed in a graceful or user-friendly manner.

When ExitBFCache( ) is called or invoked, suspended operations of the plug-in are to resume. It should be noted that there is no guarantee that ExitBFCache will ever be called (e.g., the UI tab could be closed). A tab is said to be "suspended" or "in BFCache" between the time EnterBFCache returns a success code and the time ExitBFCache is called.

Another element that may be included or implemented in Web content is references to Web content in other tabs. When suspending Web content, the Web content suspension module 128 can break those references, such as by replacing those references to objects or elements of the suspended Web content with references to objects or elements generated by the Web content suspension module 128 (and/or Web application 106), and maintaining a record of those replacements. When reactivating Web content, the Web content reactivation module 130 uses the record of the various replacements, re-establishing the broken references by returning the references to the objects or elements generated by the Web content suspension module 128 to objects or elements in the reactivated Web content.

In one or more embodiments, when suspending Web content all of the elements of the Web content discussed above are suspended. For example, all audio and/or video playback is paused, all animations and/or transitions are paused, messages to all Web worker threads are paused, and so forth. Alternatively, when suspending Web content some of the elements of the Web content are suspended while others are not. For example, audio and/or video playback may be paused, animations and/or transitions may be paused, but messages from the message pump or message dispatcher of the Web application 106 to the Web content are not stopped.

Figure 6:
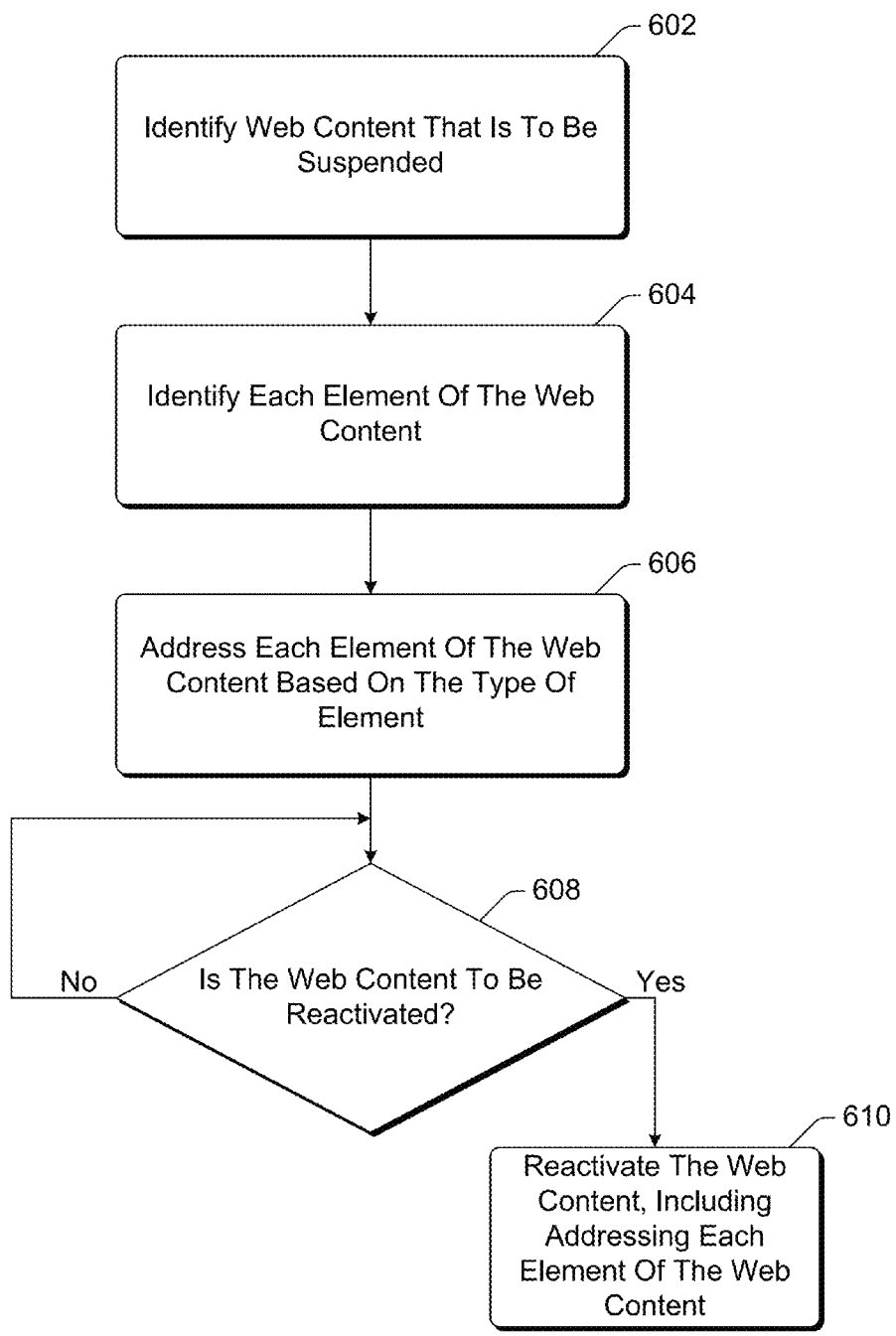
FIG. 6 is a flowchart illustrating an example process for suspending Web content in accordance with one or more embodiments.

FIG. 6 is a flowchart illustrating an example process 600 for suspending Web content in accordance with one or more embodiments. Process 600 is carried out by a module of a device, such as Web content suspension module 128 of FIG. 1, and can be implemented in software, firmware, hardware, or combinations thereof. Process 600 is shown as a set of acts and is not limited to the order shown for performing the operations of the various acts. Process 600 is an example process for suspending Web content; additional discussions of suspending Web content are included herein with reference to different figures.

In process 600, Web content that is to be suspended is identified (act 602). Web content that is to be suspended can be identified in various manners, such as Web content that is hosted in a hidden tab associated with a user interface tab as discussed above. The Web content that is to be suspended can alternatively be identified in other manners, such as in response to the Web application hosting (or including a tab hosting) the Web content no longer being the visible application (e.g., being an application that is minimized, suspended, etc.), in response to a change in which UI tab is displayed by the Web application, the Web application determining for other reasons that the Web content is to be suspended, and so forth.

Each element of the Web content that is to be suspended is identified (act 604). Web content can include various different elements, such as audio/video content, asynchronous requests, scripts, and so forth as discussed above.

Each element of the Web content is addressed based on the type of element (act 606). Addressing the element for suspension of the Web content refers to taking any appropriate actions so that the Web content that includes the element can be suspended. Various actions can be taken as discussed above, such as pausing audio/video content, holding replies to asynchronous requests, and so forth as discussed above.

A check can then be made as to whether the Web content is to be reactivated (act 608). The Web content can be reactivated in response to any of a variety of different events, such as the tab hosting the Web content being switched to being a visible tab, the Web application hosting (or including a tab hosting) the Web content becoming the visible application, in response to a change in which UI tab is displayed by the Web application, and so forth.

If the Web content is to be reactivated, then the Web content is reactivated including addressing each element in the suspended Web content (act 610). The Web content can include multiple elements as discussed above. Addressing the element for reactivation of the Web content refers to taking any appropriate actions so that the Web content that includes the element can be reactivated. Various actions can be taken as discussed above, such as resuming audio/video content playback, providing queued replies to asynchronous requests to the Web content, and so forth as discussed above.

Suspension Compatibility

Returning to FIG. 1, the Web content suspension module 128 can suspend the Web content. The Web content has various different characteristics, such as including various different features, having been written using various conventions or techniques, and so forth. The Web content suspension module 128 uses these different characteristics of the Web content to determine whether it is desirable to suspend the Web or whether another action is to be taken (e.g., the Web content unloaded). Whether it is desirable to suspend the Web content can vary for different Web applications, and is based on various factors such as whether suspending the Web content may result in undesirable behavior of the Web content or Web application, whether suspending the Web content would significantly improve performance (e.g., improve performance by at least a threshold amount) over taking another action, and so forth. The Web content suspension module 128 uses these characteristics to determine whether Web content can be suspended. This determination is made independent of the manner in which the Web content is suspended, and independent of the scenario in which the Web content is suspended. For example, the suspending of the Web content may be suspending of a hidden tab as discussed above, suspension of all of the tabs including Web content for a UI tab, suspension when a Web application is minimized or otherwise not displayed on a computing device, suspension by being written to another storage device or memory, and so forth.

The suspension of some Web content can yield undesirable results, referred to as the Web content having a compatibility issue with being suspended. Undesirable results refer to, for example, the Web content not behaving as expected or not providing a desired user experience when suspended and/or reactivated, the Web application not behaving as expected or not providing a desired user experience when the Web content is suspended and/or reactivated, another device or module (e.g., a remote server) not behaving as expected or not providing a desired user experience when the Web content is suspended and/or reactivated, and so forth.

The Web content suspension module 128 uses a set of candidacy rules that refer to various characteristics of Web content to determine which Web content has a compatibility issue with being suspended. Web content has a compatibility issue with being suspended if the Web content is expected to (e.g., has at least a threshold probability or likelihood of) yielding undesirable results if suspended. The Web content may not actually yield undesirable results if suspended, but is nonetheless deemed to have a compatibility issue with being suspended.

Various different candidacy rules are discussed herein. It should be noted that these candidacy rules are examples, and that additional candidacy rules can be applied by the Web content suspension module 128. Furthermore, it should be noted that not all of the candidacy rules discussed herein need be used by the Web content suspension module 128. In one or more embodiments, Web content is suspended if all of the candidacy rules that are used by the Web content suspension module 128 indicate that there is not a compatibility issue with suspending the Web content. If at least one of the candidacy rules used by the Web content suspension module 128 indicates that there is a compatibility issue with suspending Web content, then the Web content is not suspended.

The Web content suspension module 128 can determine whether particular Web content has a compatibility issue with being suspended at one or more of a variety of different times. For example, one or more of the candidacy rules can be evaluated in response to the Web content being loaded and displayed by the Web application, while the Web content is being displayed by the Web application, in response to a determination that the Web content is to be suspended or unloaded, and so forth.

The candidacy rules to determine which Web content has a compatibility issue with being suspended can include an all frames rule. Web content can include multiple frames or other structures that host additional Web content, and each such frame or other structure can include additional frames or structures that host further Web content, and so forth. For example, a Web page can include an HTML iframe element that hosts an additional Web page. The all frames rule indicates that, in order for the candidacy rules for Web content to indicate there is no compatibility issue with being suspended, the candidacy rules for any additional Web content hosted in a frame or other structure of the Web content are to indicate there is no compatibility issue with such additional Web content being suspended. In other words, if there is a compatibility issue with the Web content hosted in any other frame or structure of particular Web content, then there is a compatibility issue with the particular Web content being suspended.

The candidacy rules to determine which Web content has a compatibility issue with being suspended can include a network zone rule. The network zone rule identifies one or more networks or types of networks via which the Web content source is accessed for which there is (or alternatively is not) a compatibility issue with the Web content being suspended. The network zone rule allows Web content obtained from a Web content source that can be accessed quickly (e.g., one or more files on the same computing device as the Web application, one or more files stored on a local intranet, a network accessed via a Wi-Fi or wired network connection, etc.) to have a compatibility issue with being suspended, and Web content obtained from a Web content source that is accessed more slowly (e.g., the Internet, a network accessed via a 3G (third generation) or 4G LTE (fourth generation Long Term Evolution) network type rather than a Wi-Fi or wired network connection), to not have a compatibility issue with being suspended. Thus, resources need not be expended to suspend Web content that can be obtained relatively quickly. In one or more embodiments, the network zone rule indicates that Web content obtained from a Web content source via the Internet has no compatibility issue with being suspended, but that Web content obtained from other Web content sources has a compatibility issue with being suspended.

The candidacy rules to determine which Web content has a compatibility issue with being suspended can include a compatibility record rule. A compatibility record can be maintained that identifies Web content that is compatible with being suspended and/or Web content that is not compatible with being suspended. Web content can be identified in the compatibility record as being compatible with or not compatible with being suspended in response to any of a variety of different actions, such as being added to the record by an administrator or Web content developer, being added to the record by a user of the Web application, being added to the record by another component or module, and so forth.

In one or more embodiments an API is exposed (e.g., by the Web application or another module of the operating system on the device running the Web application) that can be invoked by the Web content in order for the Web content itself to indicate whether the Web content is compatible with being suspended. For example, a "compatible" method can be exposed that the Web content can invoke to indicate that the Web content is compatible with being suspended, and an "incompatible" method can be exposed that the Web content can invoke to indicate that the Web content is not compatible with being suspended. By way of another example, a method can be exposed by the API that can be invoked by the Web content with the Web content passing a parameter value to the API indicating whether the Web content is identifying itself as being compatible or incompatible with being suspended.

It should be noted that the compatibility record rule can override all other rules in the set of candidacy rules. For example, if the compatibility record rule indicates that particular Web content is compatible with being suspended, then the Web content is deemed to be compatible with being suspended regardless of whether any other candidacy rules indicate the Web content is compatible with or not compatible with being suspended. Similarly, if the compatibility record rule indicates that particular Web content is not compatible with being suspended, then the Web content is deemed to be not compatible with being suspended regardless of whether any other candidacy rules indicate the Web content is compatible with or not compatible with being suspended.

The candidacy rules to determine which Web content has a compatibility issue with being suspended can include a history record rule. The Web application can maintain a history record, also referred to as a travel log, identifying Web content that has been accessed by the Web application. The history record can be, for example, a list of Web content identifiers (e.g., Uniform Resource Locators (URLs)) in chronological order of the Web content being accessed by the Web application. The history record rule indicates that there is a compatibility issue with suspending the Web content if the Web content is not identified in the history record, and that there is not a compatibility issue with suspending the Web content if the Web content is identified in the history record. Web content may not be identified in the history record for a variety of different reasons, such as when loading particular Web content results in being automatically forwarded or re-directed to different Web content. The Web content that forwarded or re-directed the Web application to different Web content need not be maintained in the history record, and thus need not be suspended because a user would typically not desire to return to that Web content (since returning to that Web content would result in again being forwarded or re-directed to the different Web content.

The candidacy rules to determine which Web content has a compatibility issue with being suspended can include a refresh rule. Web content can be implemented with refresh functionality, allowing the Web content to be automatically refreshed (e.g., re-obtained from the Web content source) at regular or irregular intervals. For example, Web content displaying current sports scores may be automatically refreshed every 30 or 60 seconds. The refresh capability can be implemented in a variety of different manners. For example, a Web page can include an HTML meta element that hosts an additional Web page. The refresh rule indicates that there is a compatibility issue with suspending Web content that implements refresh functionality, and that there is not a compatibility issue with suspending Web content that does not implement refresh functionality. Web content implementing refresh functionality would typically result in previous versions of the Web content (e.g., each time the Web content is refreshed) that do not need to be suspended as they may include data that is no longer accurate. Thus, Web content implementing refresh functionality is not suspended to avoid suspending Web content including data that is no longer accurate.

The candidacy rules to determine which Web content has a compatibility issue with being suspended can include a before unload event handler rule. Web content can register to receive a before unload event just prior to the Web application navigating away from the Web content. The before unload event can be used by the Web content in different manners, such as to present a UI to the user notifying the user that he or she is about to navigate away from the Web content (e.g., and receive confirmation from the user that he or she desires to navigate away from the Web content), save various information, and so forth. The before unload event handler rule indicates that there is a compatibility issue with suspending Web content that is registered to receive the before unload event, and that there is not a compatibility issue with suspending Web content that is not registered to receive the before unload event.

Alternatively, the before unload event handler rule can indicate that there is a compatibility issue with suspending Web content that is registered to receive the before unload event and would present a UI when handling the before unload event, and that there is not a compatibility issue with suspending Web content that is not registered to receive the before unload event or is registered to receive the before unload event but would not present a UI when handling the before unload event. Whether the Web content would present a UI when handling the before unload event can be determined in different manners. In one or more embodiments, a JavaScript or other script language execution engine (e.g., of the Web application or operating system) analyzes the Web content script that handles the before unload event and determines whether that script would present a UI. This analysis can be performed in different manners, such as based on whether the script returns a value (e.g., to the JavaScript or other script language execution engine) to be presented in a UI dialog.

The candidacy rules to determine which Web content has a compatibility issue with being suspended can include an unload event handler rule. Web content can register to receive an unload event just prior to the Web application navigating away from the Web content. The unload event handler rule indicates that there is a compatibility issue with suspending Web content that is registered to receive the unload event, and that there is not a compatibility issue with suspending Web content that is not registered to receive the unload event.

The candidacy rules to determine which Web content has a compatibility issue with being suspended can include a database rule. As discussed above, various different types of database transactions can be performed by Web content, such as Indexed Database transactions. The database transactions can include multiple requests that are performed by another module or device, such as requests to add database entries, change database entries remove database entries, delete tables, and so forth. The database transaction is deemed to be completed if all the requests included in the transaction are successfully performed. If one or more requests in the transaction are not successfully performed then the transaction is deemed to be not completed (and any requests that were successfully performed are rolled back). The database rule indicates that there is a compatibility issue with suspending Web content having one or more database transactions that are not completed, and that there is not a compatibility issue with suspending Web content having database transactions that are completed.

The candidacy rules to determine which Web content has a compatibility issue with being suspended can include a secure communications protocol rule. Web content can employ various different secure communications protocols to communicate with other devices, such as the HyperText Transfer Protocol Secure (HTTPS) communications protocol. The secure communications protocol rule indicates that there is a compatibility issue with suspending Web content that communicates with one or more other devices via a secure communications protocol, and that there is not a compatibility issue with suspending Web content that does not communicate with other devices using a secure communications protocol.

The candidacy rules to determine which Web content has a compatibility issue with being suspended can include a content loaded rule. It takes the Web application some duration of time (e.g., a few hundred milliseconds to a few seconds) to load Web content. The completion of loading Web content can be determined in different manners, such as by receipt of an onload event or pageshow event from an event handler of the operating system. The content loaded rule indicates that there is a compatibility issue with suspending Web content that has not completed loading, and that there is not a compatibility issue with suspending Web content that has completed loading. Thus, rather than suspending Web content that has not completed loading, Web content that has not completed loading is unloaded.

The candidacy rules to determine which Web content has a compatibility issue with being suspended can include a notification rule. Various notifications can be displayed by the Web application for Web content, each notification notifying a user of some status or request. For example, a notification can indicate that an action has occurred (e.g., a file download requested by the Web content has occurred, a file that has been requested to be downloaded by the Web content has been blocked by the Web application, etc.), can request a user input (e.g., a user input indicating whether a password for the Web content is to be saved, a user input indicating whether a file download requested by the Web content is to proceed, etc.). The notification rule indicates that there is a compatibility issue with suspending Web content if there is a notification being displayed by the Web application for the Web content, and that there is not a compatibility issue with suspending Web content if there is no notification being displayed by the Web application for the Web content.

The candidacy rules to determine which Web content has a compatibility issue with being suspended can include an open communication channel rule. Web content can communicate with other devices, such as one or more servers via the Internet, using a variety of different types of communications channels. While some communications channels can be asynchronous, others are not asynchronous and are a persistent two-way communication channel that can be opened between the Web content and the other device. Various different protocols can be used to implement such persistent communication channels, such as the WebSocket protocol. The open communication channel rule indicates that there is a compatibility issue with suspending Web content having an open communication channel with another device (e.g., an open WebSocket connection), and that there is not a compatibility issue with suspending Web content that does not have an open communication channel with another device (e.g., an open WebSocket connection). By determining that there is a compatibility issue with suspending Web content having an open communication channel with another device, situations can be avoided in which the other device is waiting for and expecting a response from the Web content but will not receive the response due to the Web content being suspended.

The candidacy rules to determine which Web content has a compatibility issue with being suspended can include a Web workers rule. Web content can include or implement Web worker threads as discussed above. The Web workers rule indicates that there is a compatibility issue with suspending Web content that includes or implements at least one Web worker thread, and that there is not a compatibility issue with suspending Web content that does not include or implement any Web worker threads.

The candidacy rules to determine which Web content has a compatibility issue with being suspended can include a plug-in rule. Web content can include or implement a plug-in that adds a feature to the Web application as discussed above. The plug-in rule indicates that there is a compatibility issue with suspending Web content that includes or implements at least one plug-in, and that there is not a compatibility issue with suspending Web content that does not include or implement any plug-ins.

The candidacy rules to determine which Web content has a compatibility issue with being suspended can include a helper objects rule. Various different toolbars or Web application (e.g., Web browser) helper objects can be invoked or otherwise accessed by Web content. These toolbars or helper objects can be intertwined with the Web content, such as by communicating with the Web content, holding references to objects in the Web content, and so forth. The helper objects rule indicates that there is a compatibility issue with suspending Web content that accesses at least one toolbar and/or at least one Web application helper object, and that there is not a compatibility issue with suspending Web content that does not access any toolbars and any Web application helper objects. By determining that there is a compatibility issue with suspending Web content that accesses at least one toolbar and/or at least one Web application helper object, situations can be avoided in which a toolbar or helper object is waiting for and expecting a response from the Web content but will not receive the response due to the Web content being suspended.

The candidacy rules to determine which Web content has a compatibility issue with being suspended can include a developer tool rule. Developer tools refer to various modules or components that are implemented or enabled by Web content to facilitate development of Web content and/or Web applications. The developer tool rule indicates that there is a compatibility issue with suspending Web content that implements or enables at least one developer tool, and that there is not a compatibility issue with suspending Web content that does not implement or enable any developer tools.

The candidacy rules to determine which Web content has a compatibility issue with being suspended can include a protected media rule. Web content can include or access media content (e.g., songs, music, electronic publications, etc.) that is the subject of any of a variety of digital rights management (DRM) mechanisms. Which media content is the subject of a DRM mechanism can be determined in a variety of manners, such as based on the manner in which the media content is accessed (e.g., using HTML Encrypted Media Extensions), based on the naming convention of the file including the media content, based on metadata associated with the media content, based on operating system components or modules accessed to decrypt the media content, and so forth. The protected media rule indicates that there is a compatibility issue with suspending Web content that includes or accesses media content that is the subject of a DRM mechanism, and that there is not a compatibility issue with suspending Web content that is not the subject of a DRM mechanism.

The candidacy rules to determine which Web content has a compatibility issue with being suspended can include a referenced tab rule. The Web content can be hosted in various different virtual tabs associated with a UI tab. Situations can arise where the Web content hosted in one tab references the Web content hosted in another tab (e.g., in a virtual tab associated with the same UI tab or a different UI tab). The referenced tab rule indicates that there is a compatibility issue with suspending Web content that references Web content hosted in another tab, and that there is not a compatibility issue with suspending Web content that does not reference Web content hosted in another tab.

The candidacy rules to determine which Web content has a compatibility issue with being suspended can include a media projection rule. Web content can project or otherwise transmit media included or identified in the Web content to another device. For example, a video identified in a Web page can be streamed by the Web content to a television that is separate from the device implementing the Web application. Web content can project or otherwise transmit media using a variety of different mechanisms, such as using the Digital Living Network Alliance (DLNA) guidelines. The media projection rule indicates that there is a compatibility issue with suspending Web content that projects or otherwise transmits media to another device, and that there is not a compatibility issue with suspending Web content that does not project or otherwise transmit media to another device.

Figure 7:
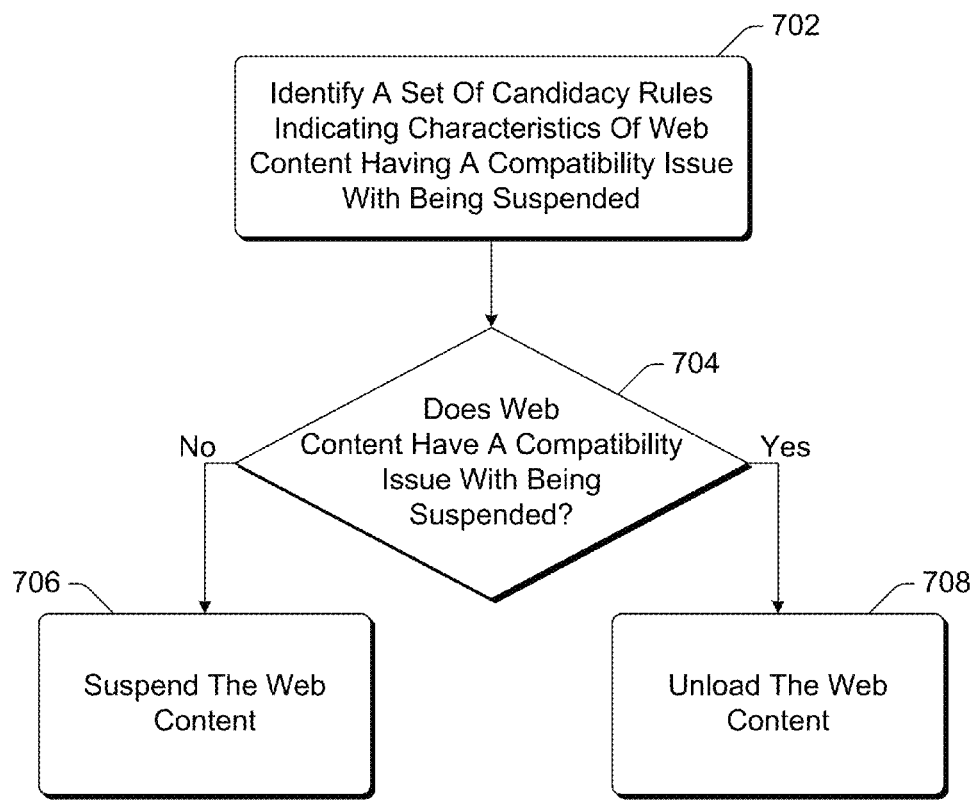
FIG. 7 is a flowchart illustrating an example process for determining whether to suspend Web content in accordance with one or more embodiments.

FIG. 7 is a flowchart illustrating an example process 700 for determining whether to suspend Web content in accordance with one or more embodiments. Process 700 is carried out by a module of a device, such as Web content suspension module 128 of FIG. 1, and can be implemented in software, firmware, hardware, or combinations thereof. Process 700 is shown as a set of acts and is not limited to the order shown for performing the operations of the various acts. Process 700 is an example process for determining whether to suspend Web content; additional discussions of determining whether to suspend Web content are included herein with reference to different figures.

In process 700, a set of candidacy rules is identified (act 702). The candidacy rules indicate various characteristics of Web content having a compatibility issue with being suspended. Web content has a compatibility issue with being suspended if the Web content is expected to yield (e.g., has at least a threshold probability or likelihood of yielding) undesirable results if suspended as discussed above.

A check is made as to whether the Web content has a compatibility issue with being suspended (act 704). This check is made based on the set of candidacy rules as discussed above.

If the Web content does not have a compatibility issue with being suspended, then the Web content is suspended (act 706). However, if the Web content does have a compatibility issue with being suspended, then the Web content is unloaded (or alternatively another action is taken) rather than being suspended (act 708).

Web Content Lifetime Management

Returning to FIG. 1, the Web content lifetime management module 132 uses a set of various lifetime criteria to determine when suspended Web content is to no longer be maintained. The Web content lifetime management module 132 uses various different lifetime criteria to determine when suspended Web content is to no longer be maintained. This determination is made independent of the manner in which the Web content is suspended, and independent of the scenario in which the Web content is suspended. For example, the suspended Web content may be Web content hosted in a hidden tab as discussed above, Web content hosted in a tab including Web content for a UI tab, Web content hosted by a Web application that is minimized or otherwise not displayed on a computing device, Web content written to another storage device or memory, and so forth.

In one or more embodiments, the Web content lifetime management module 132 manages, for one or more UI tabs 110, how long an associated hidden tab 114 and/or an empty tab 116 is maintained, as well as when to create a new empty tab 116.

Web content that is to no longer be maintained is disposed of. Disposing of Web content refers to deleting or otherwise reclaiming storage space used by the Web content. The manner in which the Web content is disposed of can vary based on how the Web content is stored. For example, if the Web content is stored having been written to another storage device or memory, then the Web content can be disposed of by being deleted. By way of another example, if the Web content is hosted in a virtual tab associated with a UI tab, then the Web content can be disposed of by deleting or recycling the virtual tab. Deleting a virtual tab refers to unloading the Web content from the virtual tab and removing references to the virtual tab. Recycling a virtual tab refers to unloading the Web content from the virtual tab and having the virtual tab switching module 122 switch the virtual tab to being an empty tab 116.

Various different lifetime criteria indicating when Web content is to no longer be maintained (is to be disposed of) are discussed herein. The lifetime criteria can take into account various factors, such as the amount of device resources (e.g., memory) the Web content is consuming, whether the Web content is likely (e.g., at least a threshold probability) of being displayed again by the Web application, and so forth. It should be noted that these lifetime criteria are examples, and that additional criteria can be applied by the Web content lifetime management module 132. Furthermore, it should be noted that not all of the criteria discussed herein need be used by the Web content lifetime management module 132. In one or more embodiments, Web content is disposed of if at least one of the criteria indicates that Web content is to be disposed of.

The lifetime criteria can include a number of tabs criteria. The Web content lifetime management module 132 can allow only a threshold amount of Web content (e.g., a threshold number of hidden tabs 114) to be associated with the UI tab 110 at any given time. This threshold number can be a fixed number (e.g., one). Alternatively, this threshold number can be a relative number, e.g., varying based on resource (e.g., memory) availability in the computing device 100, varying based on how many programs in addition to the Web application 106 are running on the computing device 100, based on the type of Web content (e.g., the threshold number can be increased for types of Web content that a user is deemed to be more likely (e.g., greater than a threshold likelihood) to be navigating back and/or forward through than types of Web content that a user is deemed to be less likely (e.g., less than a threshold likelihood) to be navigating back and/or forward through), and so forth. For example, the module 132 may allow any amount of Web content (e.g., any number of hidden tabs 114) until at least a threshold amount of memory in the computing device (e.g., 50%) is allocated to the Web application 106. By way of another example, the module 132 may allow a larger amount of Web content (e.g., a larger number of hidden tabs, such as five) when the type of Web content is news articles (e.g., that a user is more likely to navigate back and forth through), and a smaller amount of Web content (e.g., a smaller number of hidden tabs, such as zero or one) when the type of Web content is content providing access to a social networking or email Web site.

The lifetime criteria can include an application terminated criteria. A Web application can be terminated in various situations, such as in response to a user request to close the Web application, in response to a process lifetime manager (PLM) component or module of the computing device running the Web application terminating the Web application due to various termination criteria being satisfied, and so forth. If the Web application is terminated, then the Web content in all of the UI tabs of the Web application is disposed of (including virtual tabs and/or other suspended Web content).

The lifetime criteria can include an inactive application criteria. The Web application may not be the active application (may be an inactive application), such as being an application that is minimized, suspended, and so forth. If the Web application is an inactive application for at least a threshold amount of time (e.g., sixty minutes, although other threshold amounts of time can alternatively be used), then the Web content in all of the UI tabs of the Web application (including virtual tabs and/or other suspended Web content) is disposed of. The Web content can be disposed of in response to the threshold amount of time elapsing, or alternatively at other times (e.g., in response to the Web application becoming an active application).

The lifetime criteria can include an active tab criteria. In situations where a user switches from one UI tab to another UI tab, it is oftentimes unlikely that the user will switch back to the previous UI tab and then navigate back (e.g., through his or her history of Web content). Thus, if the UI tab is not currently active (is not the UI tab currently being displayed) for at least a threshold amount of time (e.g., one minute, although other threshold amounts of time can alternatively be used), Web content in virtual tabs associated with the UI tab that is not currently active is disposed of.

The lifetime criteria can include a tab closed criteria. A UI tab can be closed in various situations, such as in response to a user request to close the UI tab, in response to the Web application determining that the UI tab is to be closed due to various criteria being satisfied (e.g., a threshold number of UI tabs being open), and so forth. If the UI tab is closed, then all of the Web content displayed in the UI tab (including Web content hosted in virtual tabs associated with the UI tab, if any) is disposed of.

The lifetime criteria can include a crash recovery criteria. Crash recovery can be performed in a computing device in response to various problems being detected in the computing device and/or the Web application. Crash recovery refers to saving various state or other information regarding the computing device and/or the Web application, as well as optionally restarting the computing device and/or Web application. In performing crash recovery, Web content displayed in the UI tab (including Web content hosted in virtual tabs associated with the UI tab, if any) is disposed of.

The lifetime criteria can include a new window criteria. Situations can arise where a UI tab of a Web application is changed to a new window (e.g., the UI tab in a new instance of the Web application). This change can occur in response to various events, such as a user request (e.g., by dragging and dropping the UI tab to a new location), a request from another component or module, and so forth. If the UI tab is changed to a new window, the virtual tabs associated with the UI tab are disposed of. The virtual tabs can be deleted, or alternatively recycled (becoming empty tabs). Alternatively, the virtual tabs associated with the UI tab that is changed to a new window can remain associated with the UI tab and need not be disposed of.

The lifetime criteria can include an active page criteria. Situations can arise in which a threshold amount of time (e.g., one hour, although different threshold amounts of time can alternatively be used) elapses since particular Web content was displayed (e.g., since a particular virtual tab was last a visible tab). After the threshold amount of time elapses, it is unlikely that the user will want to navigate back to the Web content, and if he or she does navigate back after the threshold amount of time elapses it is more desirable to reload the Web content to ensure the Web content is current. If Web content has not been displayed (e.g., a tab has not been the visible tab) for at least the threshold amount of time, the Web content is disposed of. The Web content can be disposed of in response to the threshold amount of time elapsing, or alternatively at other times.

The active page criteria can optionally include a threshold use time, indicating a threshold amount of time that is to elapse until the Web content can be disposed of. For example, the threshold amount of time may be three or five seconds. The Web content is not disposed of until the Web content has been loaded (e.g., hosted in a tab) for at least the threshold use amount of time.

When disposing of Web content, which Web content is disposed of can be determined in various manners. For example, the particular lifetime criteria may indicate which Web content is disposed of (e.g., all of the Web content displayed in a UI tab). By way of another example, particular Web content to be disposed of can be selected, such as disposing of the least recently displayed Web content, disposing of the largest Web content (the Web content using the largest amount of memory of the computing device 100), and so forth. How much Web content (e.g., how many virtual tabs hosting Web content) is disposed of can be determined in different manners, such as disposing of a sufficient amount of Web content so that lifetime criteria no longer indicates that Web content is to be disposed of.

In addition to determining when to dispose of Web content, the Web content lifetime management module 132 can also determine when to generate a new empty virtual tab. In one or more embodiments, the Web content lifetime management module 132 has the tab generation module 124 generate a new empty tab if there are less than a threshold number of empty tabs available for use by one or more UI tabs. This threshold number can be a fixed number (e.g., one). Alternatively, this threshold number can be a relative number, e.g., varying based on resource (e.g., memory) availability in the computing device 100, varying based on how many programs in addition to the Web application 106 are running on the computing device 100, and so forth.

Figure 8:
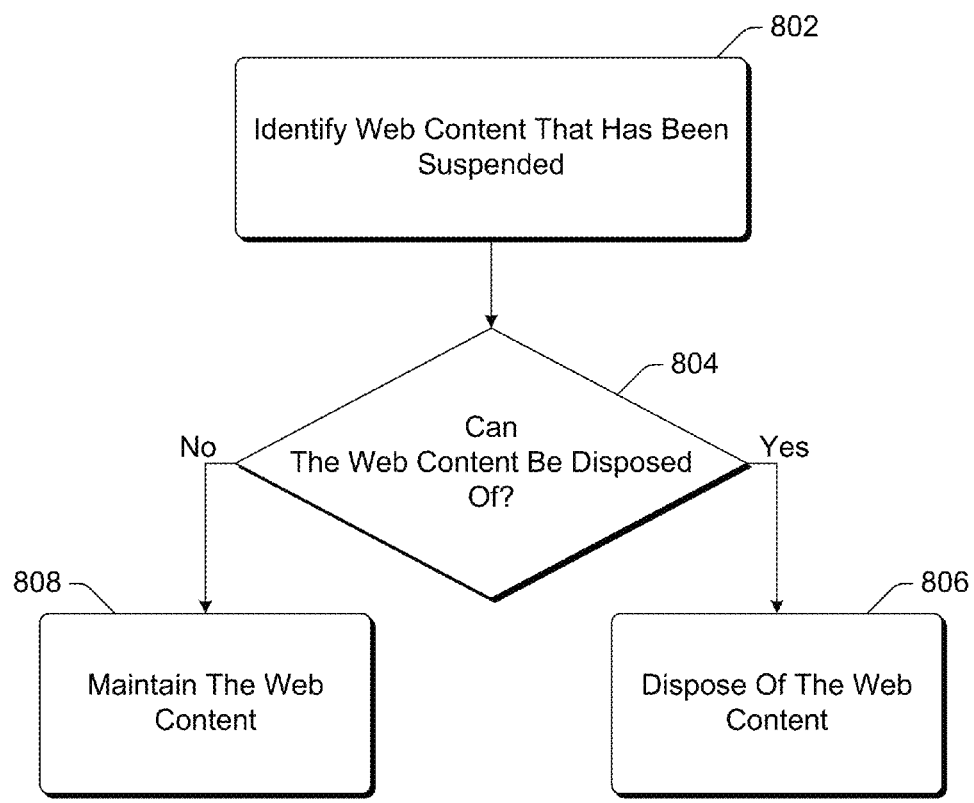
FIG. 8 is a flowchart illustrating an example process for disposing of Web content in accordance with one or more embodiments.

FIG. 8 is a flowchart illustrating an example process 800 for disposing of Web content in accordance with one or more embodiments. Process 800 is carried out by a module of a device, such as Web content suspension module 128 of FIG. 1, and can be implemented in software, firmware, hardware, or combinations thereof. Process 800 is shown as a set of acts and is not limited to the order shown for performing the operations of the various acts. Process 800 is an example process for disposing of Web content; additional discussions of disposing of Web content are included herein with reference to different figures.

In process 800, Web content that has been suspended is identified (act 802). A check is made as to whether the suspended Web content can be disposed of (act 804). This check is made based on various different lifetime criteria as discussed above.

If the Web content can be disposed of, then the Web content is disposed of (act 806). Disposing of the Web content can take various forms as discussed above, such as deleting a tab hosting the Web content and/or recycling a tab hosting the Web content. However, if the Web content cannot be disposed of, then the Web content is maintained (act 808).

Example System

Although particular functionality is discussed herein with reference to particular modules and applications, it should be noted that the functionality of individual modules and/or applications discussed herein can be separated into multiple modules and/or applications, and also noted that at least some functionality of multiple modules and/or applications can be combined into a single module and/or application. Additionally, a particular module and/or application discussed herein as performing an action includes that particular module and/or application itself performing the action, or alternatively that particular module and/or application invoking or otherwise accessing another component, module, or application that performs the action (or performs the action in conjunction with that particular module and/or application). Thus, a particular module and/or application performing an action includes that particular module and/or applications itself performing the action, as well as another module and/or applications invoked (or otherwise accessed) by that particular module and/or applications performing the action.

Figure 9:
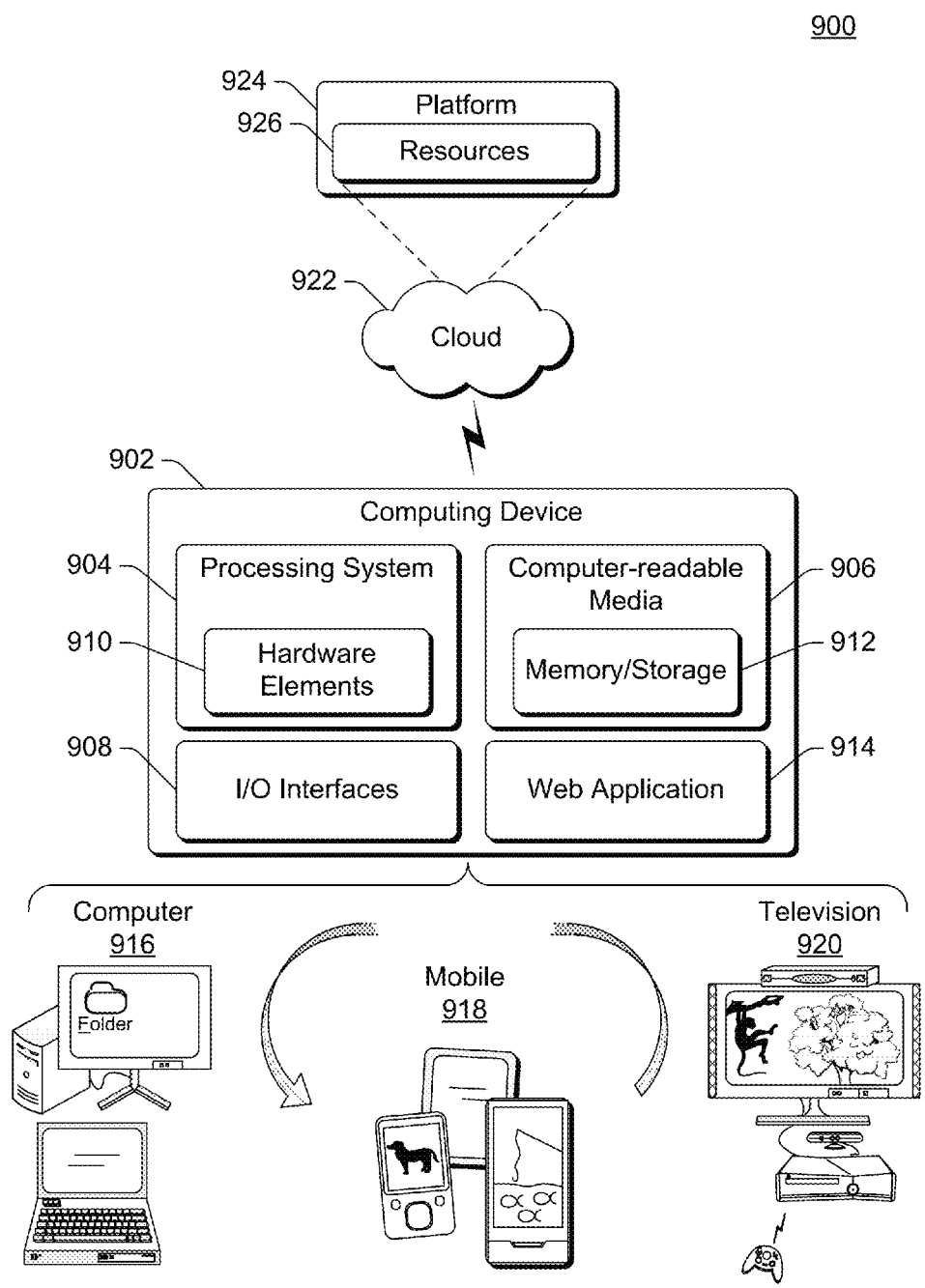
FIG. 9 illustrates an example system that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Computing device 902 also includes a Web application 914. Web application 914 is a Web application as discussed above, such as Web application 106 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying first Web content in a user interface tab of a Web application;
   receiving a request to change from displaying the first Web content to displaying second Web content in the user interface tab;
   displaying, in response to the request, the second Web content in the user interface tab;
   keeping the first Web content in a first hidden tab that is a virtual tab associated with the user interface tab while displaying the second Web content in the user interface tab; and
   suspending the first Web content based on determining that the first Web content is compatible with being suspended by accessing a record that identifies Web content that is compatible with being suspended and other Web content that is not compatible with being suspended.

2. The method as recited in claim 1, further comprising:
   receiving, after suspending the first Web content, an additional request to change to displaying the first Web content in the user interface tab;
   reactivating, in response to the additional request, the first Web content;
   displaying the first Web content;
   keeping the second Web content in a second hidden tab corresponding to the user interface tab; and
   suspending the second Web content.

3. The method as recited in claim 1, the Web application comprising a Web browser, the first Web content comprising a first Web page, and the second Web content comprising a second Web page.

4. The method as recited in claim 1, the suspending the first Web content including pausing playback of audio and/or video content included in the first Web content.

5. The method as recited in claim 1, the suspending the first Web content including:
   receiving one or more replies to one or more asynchronous requests sent by the first Web content to another device;
   holding the one or more replies;
   providing the one or more replies to the first Web content in response to the first Web content being subsequently reactivated.

6. The method as recited in claim 1, the suspending the first Web content including stopping providing to the first Web content messages of when events occur.

7. The method as recited in claim 6, the stopping comprising stopping sending messages that would trigger execution of JavaScript in the first Web content.

8. The method as recited in claim 1, the suspending the first Web content including stopping a timer that controls each animation element and each transition element in the first Web content.

9. The method as recited in claim 1, the suspending the first Web content including stopping providing to Web worker threads of the first Web content messages of when events occur.

10. The method as recited in claim 1, the suspending the first Web content including:
sending a request to a plug-in that adds a feature to the Web application for the plug-in to suspend itself; and
unloading, rather than suspending, the first Web content in response to the plug-in not being able to suspend itself.

11. The method as recited in claim 1, further comprising deleting one or more hidden tabs associated with the user interface tab in response to more than a threshold number of hidden tabs being associated with the user interface tab.

12. The method as recited in claim 1, the second Web content having been in a second hidden tab corresponding to the user interface tab, and the displaying the second Web content comprises switching the second hidden tab to being the visible tab corresponding to the user interface tab.

13. The method as recited in claim 1, the first hidden tab being available for use with at least one user interface tab different than the user interface tab.

14. A computing device comprising:
one or more processors;
one or more computer-readable media having stored thereon multiple instructions that, when executed by the one or more processors, cause the one or more processors to perform acts comprising:
displaying a plurality of user interface tabs of a Web browser each having simultaneously its own virtual tabs comprising an associated visible tab and an associated hidden tab;
displaying in a first user interface tab of the plurality of user interface tabs a first Web page hosted in the visible tab associated with the first user interface tab;
generating an empty tab;
receiving a request to change from displaying the first Web page to displaying a second Web page in the first user interface tab;
loading, in response to the request, the second Web page in the previously generated empty tab;
switching the previously generated empty tab to being the visible tab associated with the first user interface tab; and
displaying the second Web page hosted in the visible tab associated with the first user interface tab in the first user interface tab while keeping the first Web page hosted in the hidden tab associated with the first user interface tab.

15. The computing device as recited in claim 14, the empty tab hosting a blank Web page.

16. The computing device as recited in claim 14, the acts further comprising:
suspending the first Web page; and
switching the previously visible tab to being a hidden tab.

17. The computing device as recited in claim 16, the acts further comprising:
receiving, after suspending the first Web page, an additional request to change to displaying the first Web page in the first user interface tab;
reactivating, in response to the additional request, the first Web page;
switching the hidden tab hosting the first Web page to being a visible tab;
displaying the first Web page;
switching the tab hosting the second Web page to being a hidden tab; and
suspending the second Web page.

18. The computing device as recited in claim 16, the suspending the first Web page comprising:
pausing playback of audio and/or video content included in the first Web page;
pausing each animation element and each transition element in the first Web page; and
stopping providing to Web worker threads of the first Web page messages of when events occur.

19. The computing device as recited in claim 14, the acts further comprising generating, after loading the second Web content in the previously generated empty tab, a new empty tab.

20. A method comprising:
displaying a first Web page in a user interface tab of a Web browser;
receiving a request to change from displaying the first Web page to displaying a second Web page in the user interface tab;
displaying, in response to the request, the second Web page in the user interface tab;
keeping the first Web page in a first hidden tab corresponding to the user interface tab; and
suspending the first Web page, the suspending including:
pausing playback of audio and/or video content included in the first Web page,
stopping providing to the first Web page messages of when events occur that would trigger execution of JavaScript in the first Web page,
sending a request to a plug-in that adds a feature to the Web browser for the plug-in to suspend itself, and
unloading, rather than suspending, the first Web page in response to the plug-in not being able to suspend itself.

* * * * *